US012619128B2

(12) United States Patent
Kim

(10) Patent No.: US 12,619,128 B2
(45) Date of Patent: May 5, 2026

(54) CAMERA ACTUATOR AND CAMERA MODULE INCLUDING SAME

(71) Applicant: LG INNOTEK CO., LTD., Seoul (KR)

(72) Inventor: Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 667 days.

(21) Appl. No.: 17/920,235

(22) PCT Filed: Apr. 20, 2021

(86) PCT No.: PCT/KR2021/004930
§ 371 (c)(1),
(2) Date: Oct. 20, 2022

(87) PCT Pub. No.: WO2021/215785
PCT Pub. Date: Oct. 28, 2021

(65) Prior Publication Data
US 2023/0161229 A1     May 25, 2023

(30) Foreign Application Priority Data

Apr. 20, 2020     (KR) ........................ 10-2020-0047493

(51) Int. Cl.
*G03B 13/36*          (2021.01)
*G03B 5/00*          (2021.01)
(Continued)

(52) U.S. Cl.
CPC ............... *G03B 13/36* (2013.01); *G03B 5/00* (2013.01); *H02N 2/026* (2013.01); *H02N 2/062* (2013.01);
(Continued)

(58) Field of Classification Search
CPC . G02B 7/021; G02B 7/08; G02B 7/09; G02B 7/10; G02B 7/102; G02B 9/62;
(Continued)

(56) References Cited

U.S. PATENT DOCUMENTS 5,432,639 A     7/1995 Sakamoto
6,051,971 A *   4/2000 Holden ................ G01D 5/2457
                                      33/708
(Continued)

FOREIGN PATENT DOCUMENTS

CN     102333190 A     1/2012
EP     0 484 250 A1    5/1992
(Continued)

*Primary Examiner* — Marin Pichler
(74) *Attorney, Agent, or Firm* — Birch, Stewart, Kolasch & Birch, LLP

(57) ABSTRACT

A lens driving device according to an embodiment includes a moving part including a lens; a driving part for driving the moving part in an optical axis direction; and a sensing part for sensing a position of the moving part; wherein the moving part includes: a magnet scaler in which a first pole and a second pole are alternately arranged in a first direction; and a reference magnet corresponding to the magnet scaler and having a first pole and a second pole disposed in a second direction perpendicular to the first direction.

10 Claims, 19 Drawing Sheets

(51) Int. Cl.
  *H02N 2/02* (2006.01)
  *H02N 2/06* (2006.01)
(52) U.S. Cl.
  CPC ................ *G03B 2205/0046* (2013.01); *G03B 2205/0061* (2013.01); *G03B 2205/0069* (2013.01)
(58) Field of Classification Search
  CPC .......................... G02B 13/001; G02B 13/0065; G02B 27/646; H04N 5/2253; H04N 5/2254; H04N 5/2257; H04N 5/23287; G03B 2205/00; G03B 2205/0007; G03B 2205/0053; G03B 2205/0069; G03B 3/02; G03B 3/10; G03B 5/00; G03B 5/04; G03B 13/36; G03B 30/00; G03B 2205/0038; H02K 11/21; H02K 11/33; H02K 41/0354; H02K 41/0356
  See application file for complete search history.

(56) References Cited

U.S. PATENT DOCUMENTS

| | | | |
|---|---|---|---|
| 7,663,820 B2 | 2/2010 | Koc et al. | |
| 7,777,969 B2 | 8/2010 | Shirono et al. | |
| 9,832,383 B2 | 11/2017 | Hwang et al. | |
| 9,958,634 B2 | 5/2018 | Lee et al. | |
| 2002/0105732 A1* | 8/2002 | Yumiki | G02B 7/102 |
| | | | 359/704 |
| 2005/0258822 A1* | 11/2005 | Hara | G02B 27/646 |
| | | | 324/207.2 |
| 2005/0258825 A1* | 11/2005 | Masuda | G01D 5/145 |
| | | | 348/E5.046 |
| 2008/0192363 A1 | 8/2008 | Shirono et al. | |
| 2015/0070564 A1 | 3/2015 | Okawa | |
| 2017/0082823 A1 | 3/2017 | Hwang et al. | |
| 2018/0052298 A1 | 2/2018 | Sueoka | |
| 2020/0409015 A1 | 12/2020 | Kim et al. | |
| 2021/0389551 A1 | 12/2021 | Jang | |

FOREIGN PATENT DOCUMENTS

| | | | |
|---|---|---|---|
| JP | 8-29657 A | 2/1996 | |
| JP | 2007-286225 A | 11/2007 | |
| KR | 10-2007-0050492 A | 5/2007 | |
| KR | 10-2009-0118192 A | 11/2009 | |
| KR | 10-2015-0020950 A | 2/2015 | |
| KR | 10-2018-0022656 A | 3/2016 | |
| KR | 10-2016-0094636 A | 8/2016 | |
| KR | 10-2018-0008848 A | 1/2018 | |
| KR | 10-2019-0103862 A | 9/2019 | |
| WO | WO 2020/078112 A1 | 4/2020 | |

* cited by examiner

【FIG. 1】
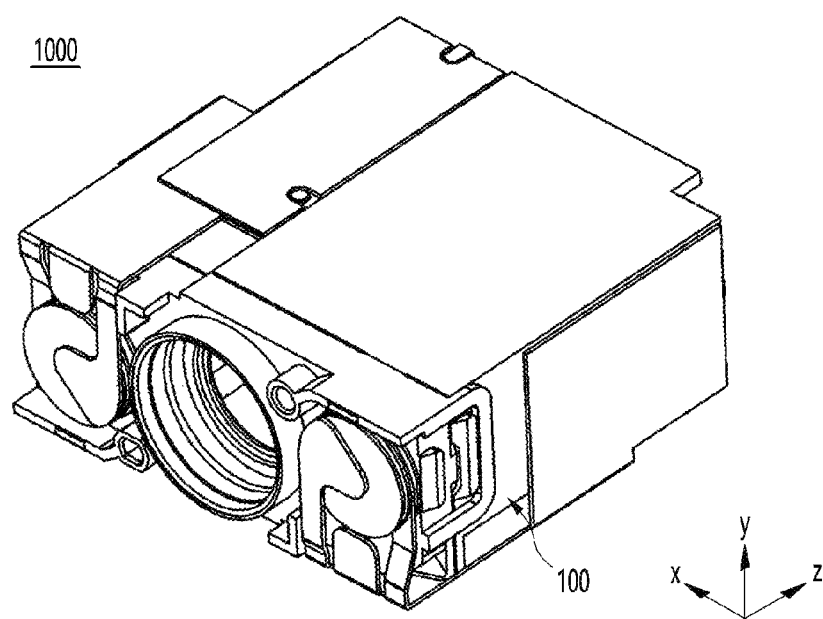

【FIG. 2】
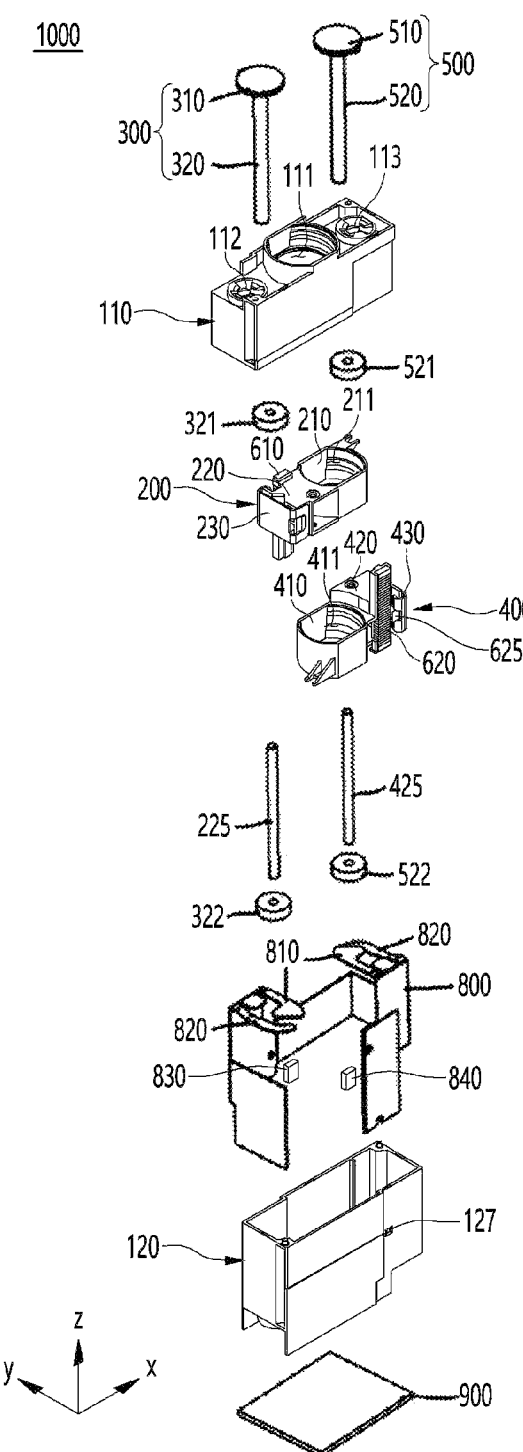

【FIG. 3】
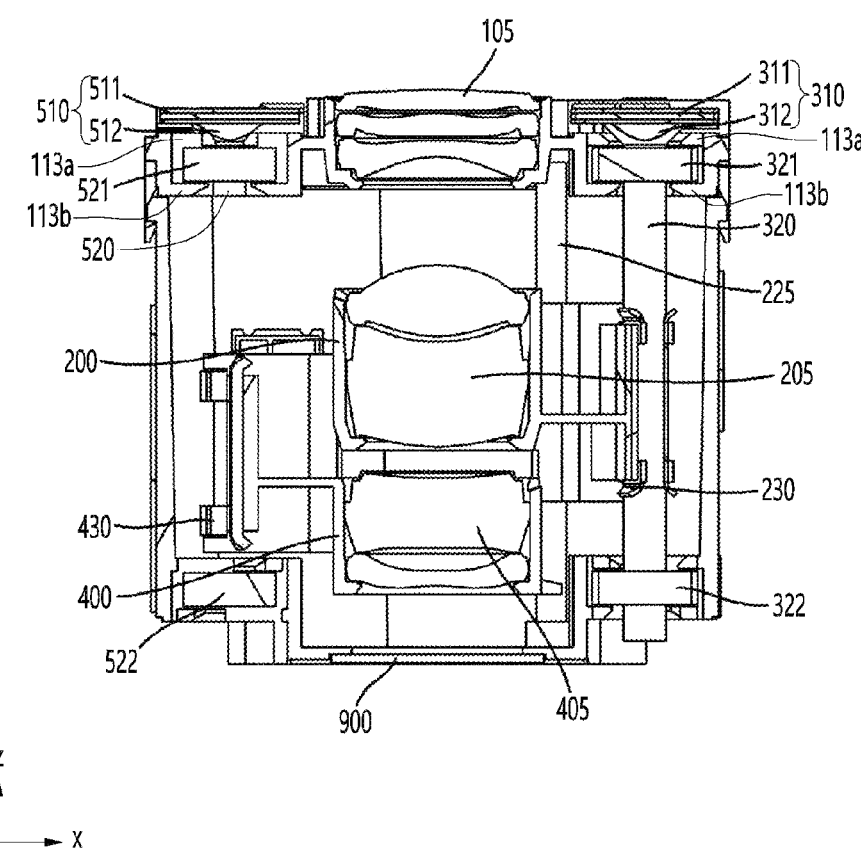
【FIG. 4】
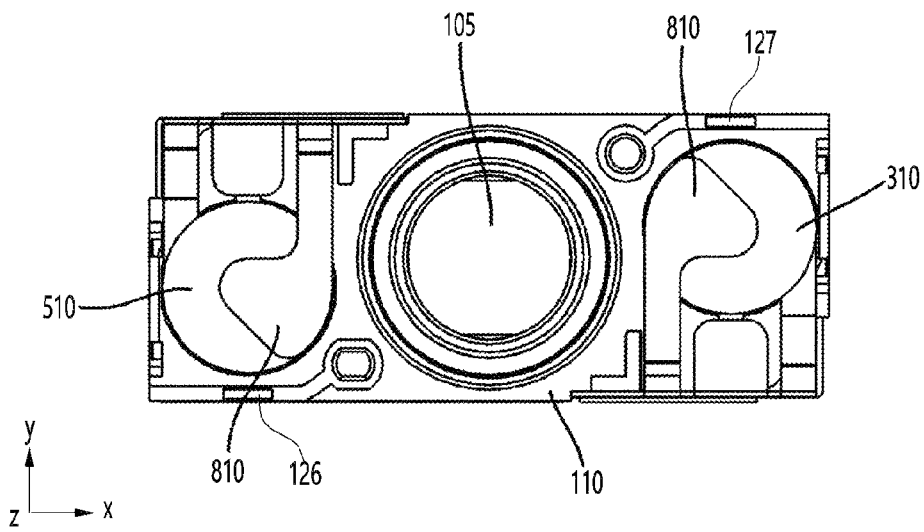

【FIG. 5】
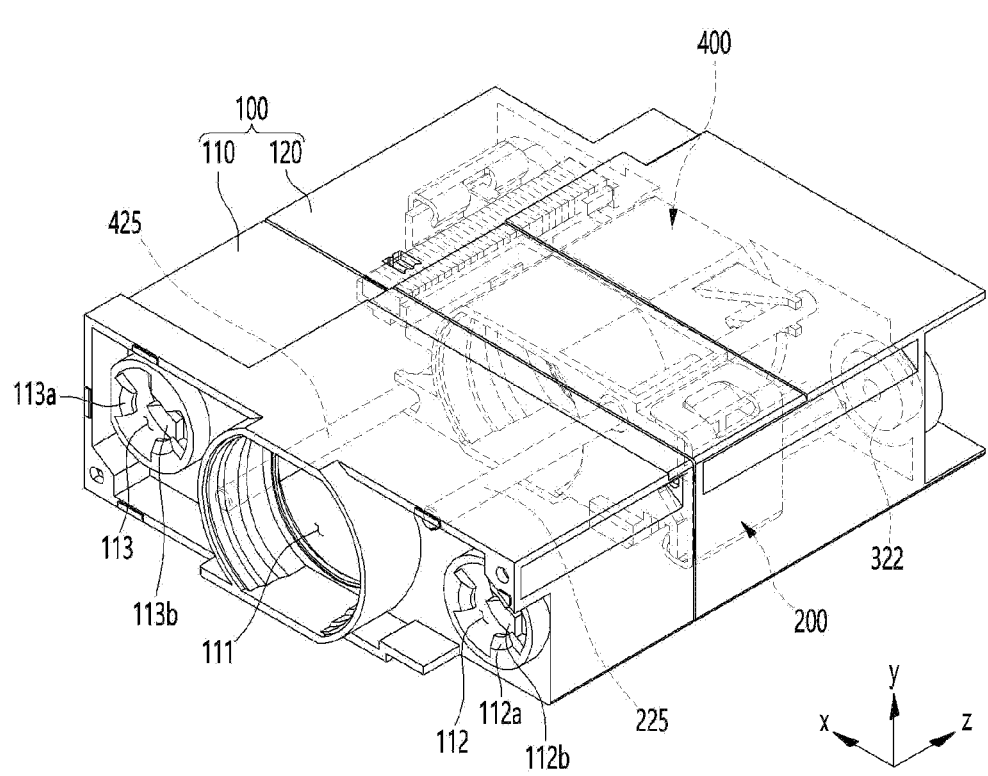

【FIG. 6】
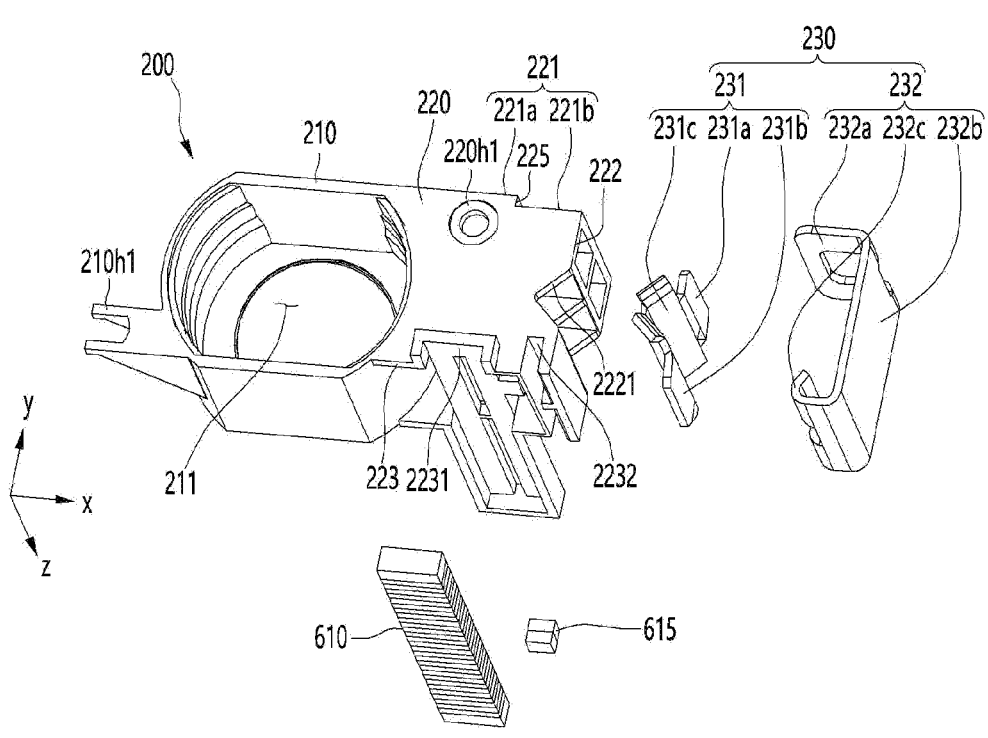

【FIG. 7】
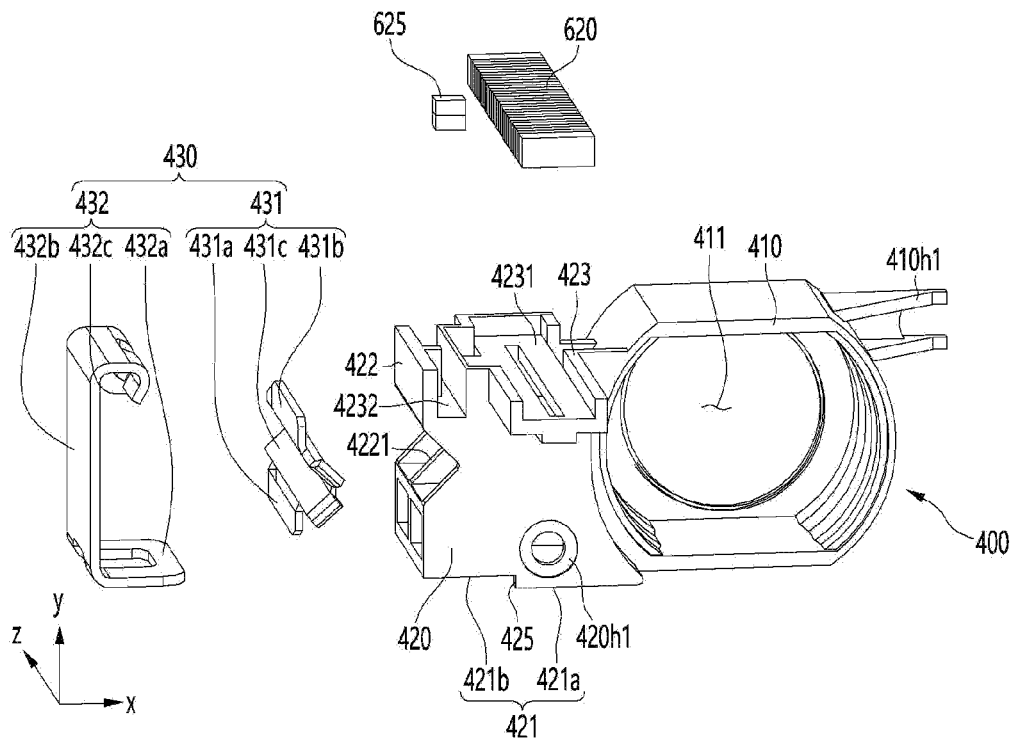
【FIG. 8】
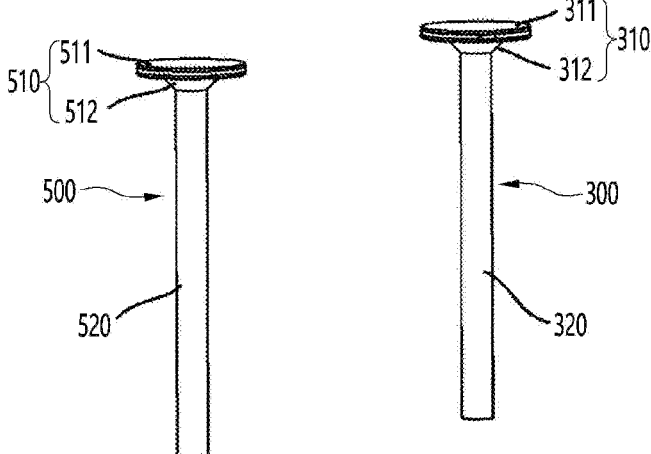

【FIG. 9】
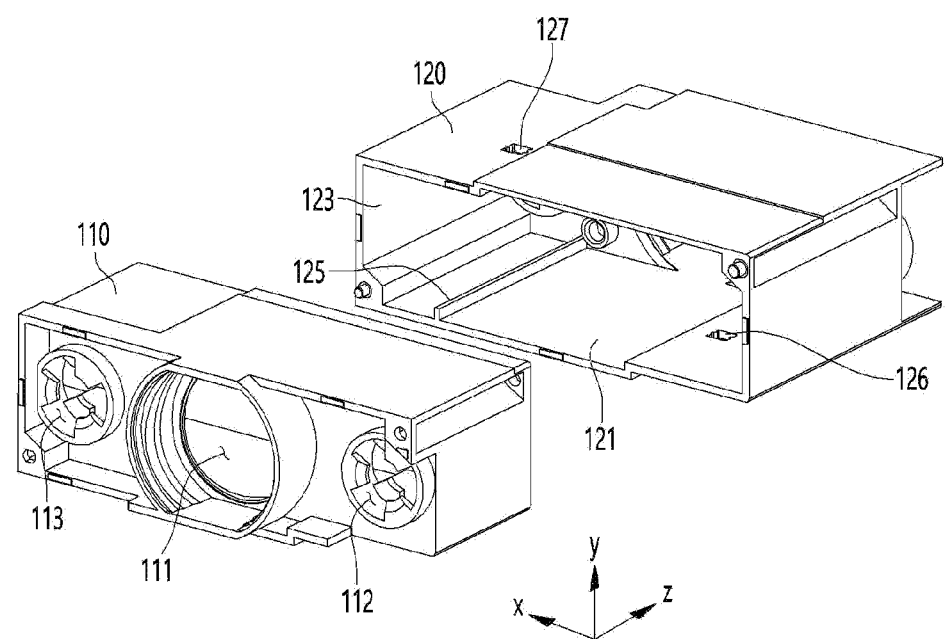
【FIG. 10】
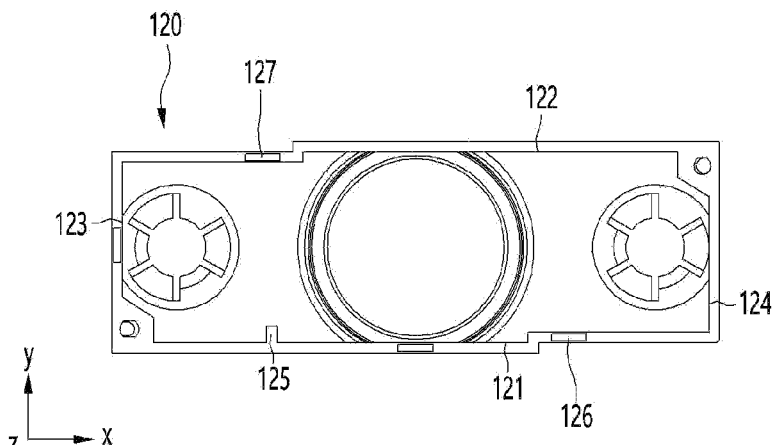

【FIG. 11】
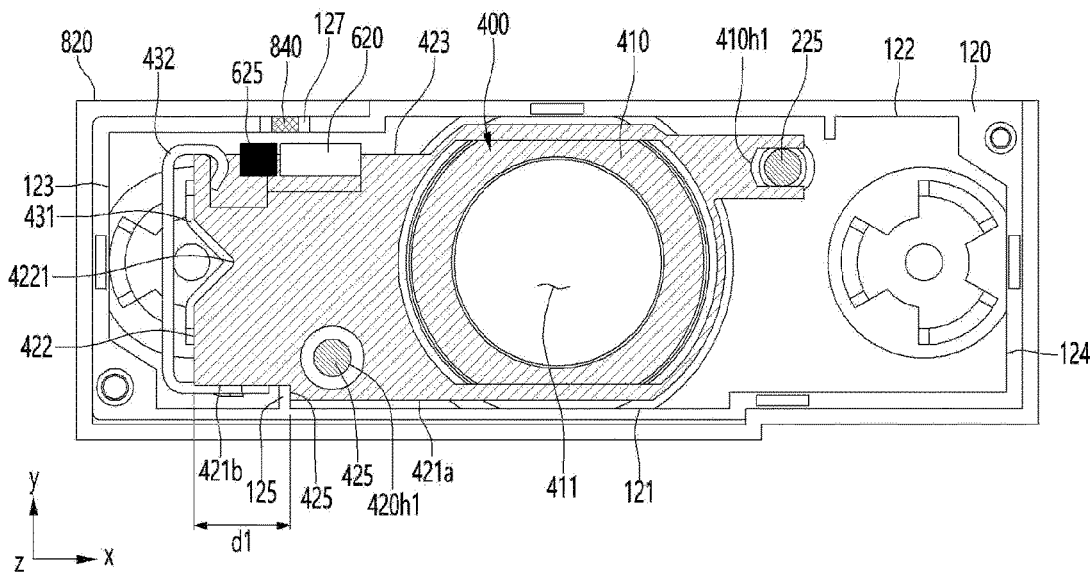
【FIG. 12】
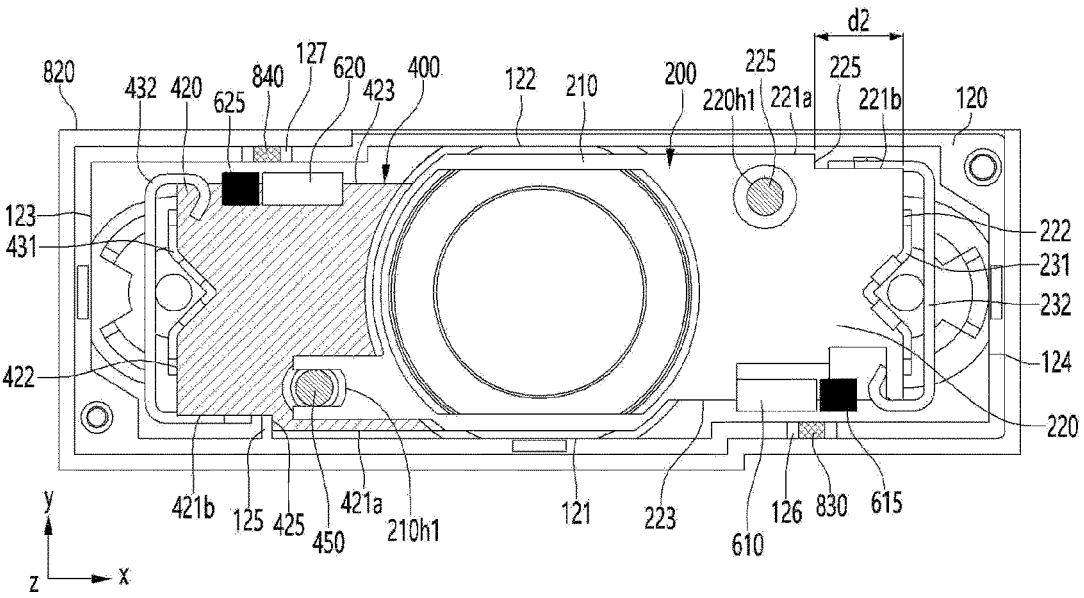

【FIG. 13】
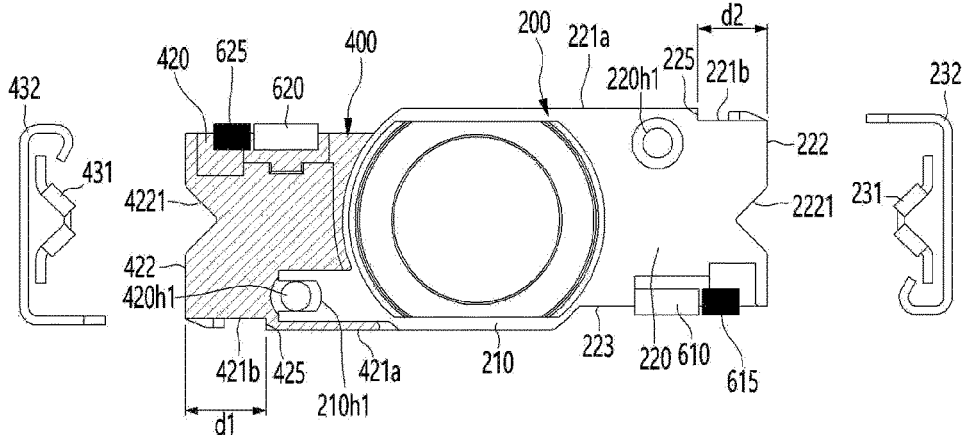
【FIG. 14】
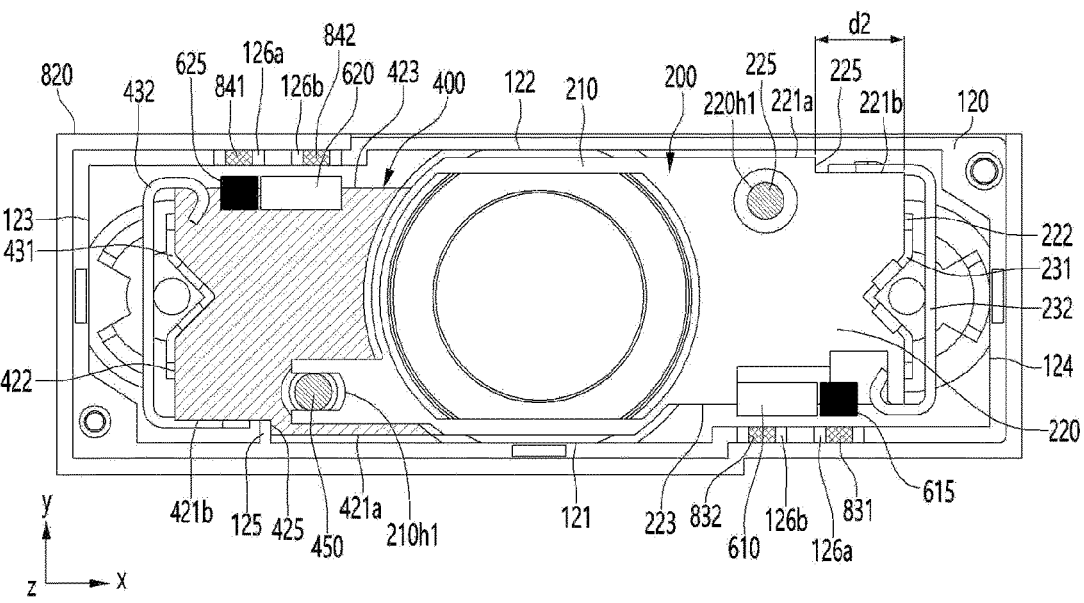

【FIG. 15】
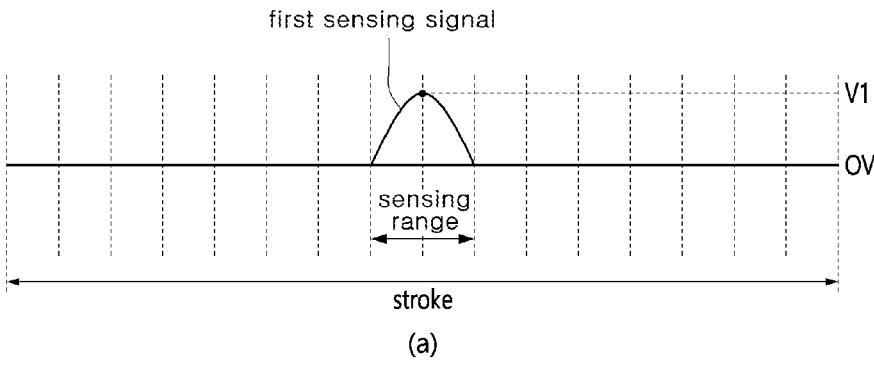
(a)
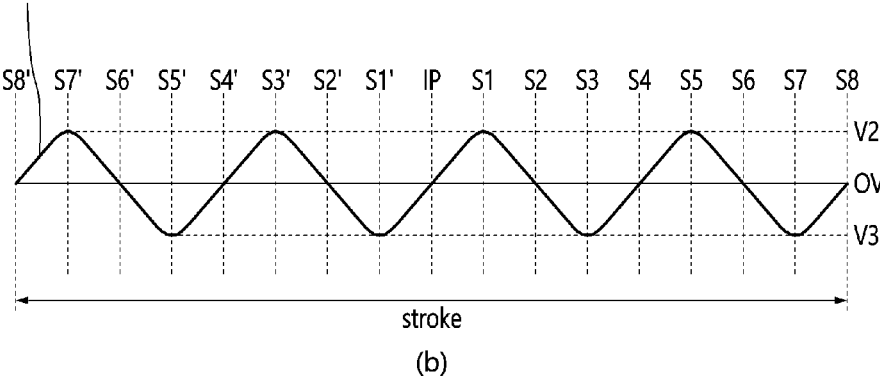
(b)

【FIG. 16】
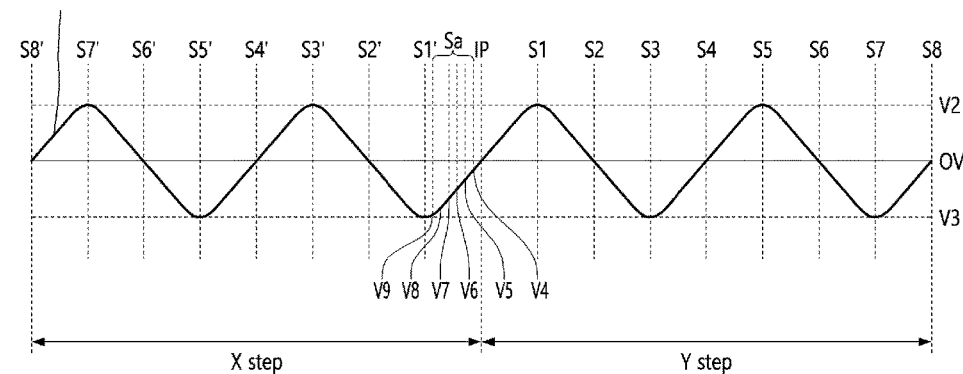
【FIG. 17】
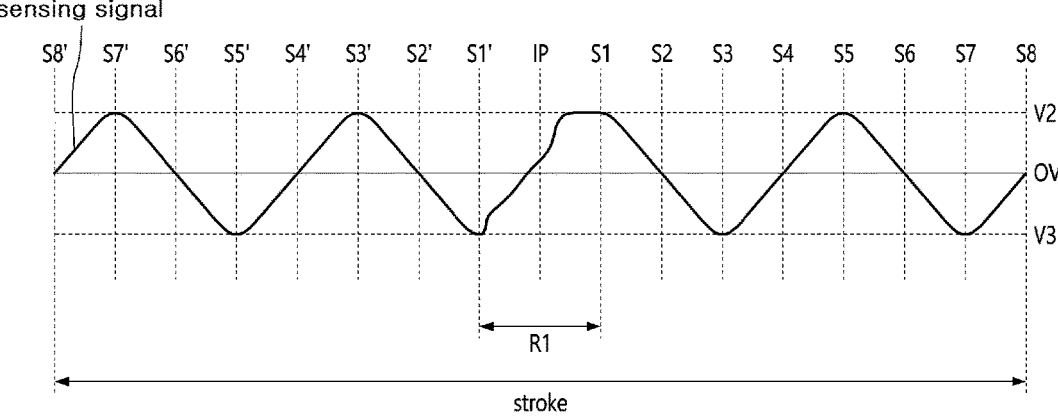

【FIG. 18】
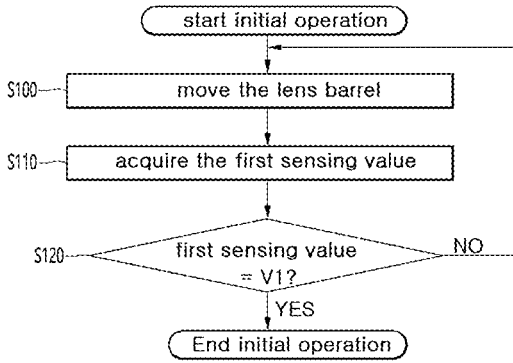
【FIG. 19】
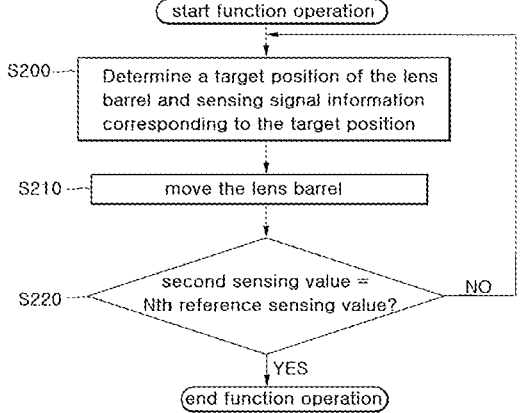

【FIG. 20】
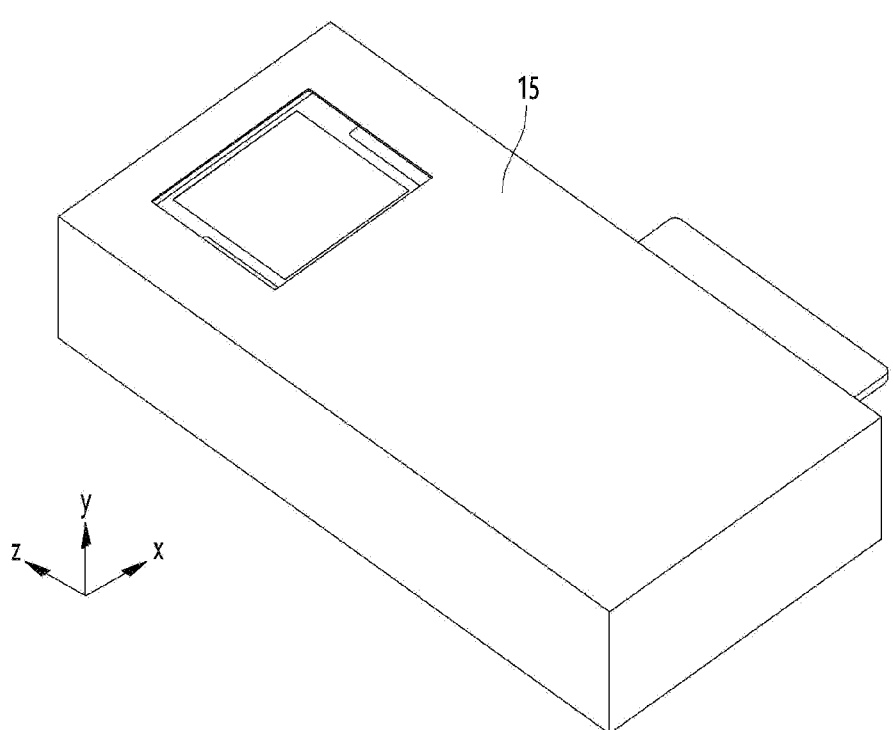

【FIG. 21】
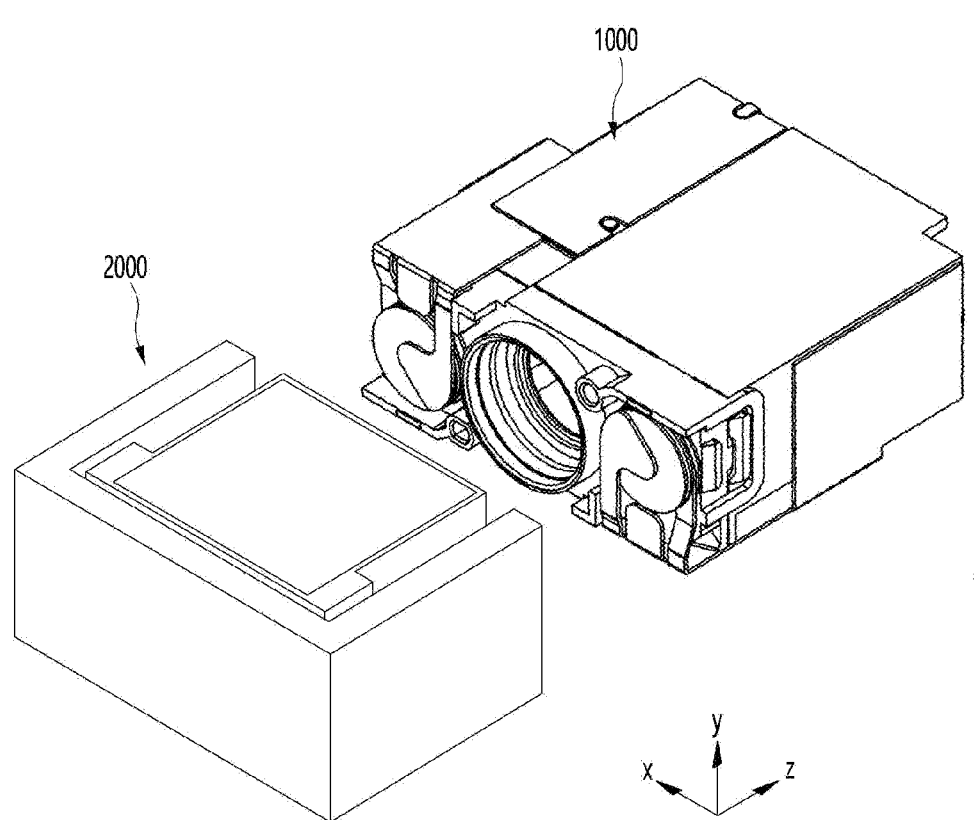

【FIG. 22】
2000
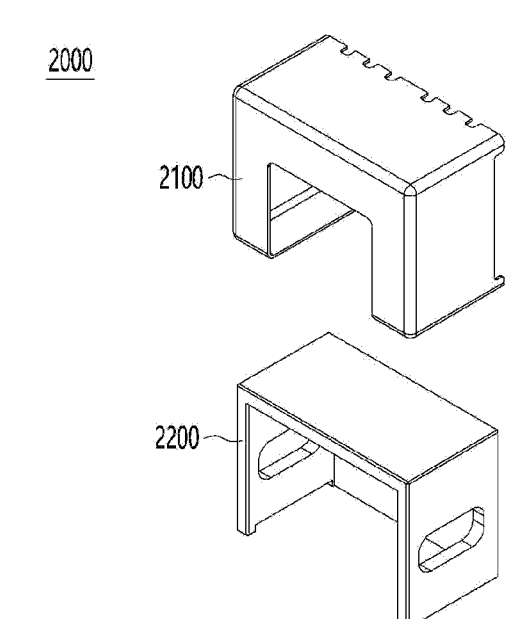
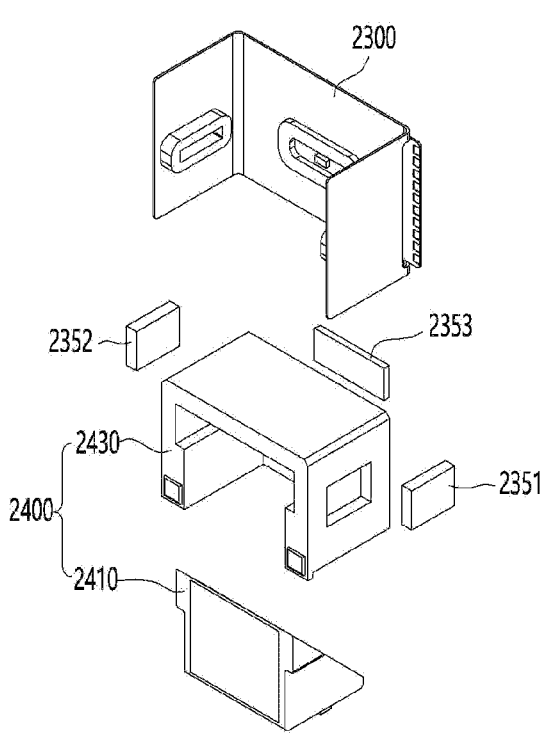

【FIG. 23】
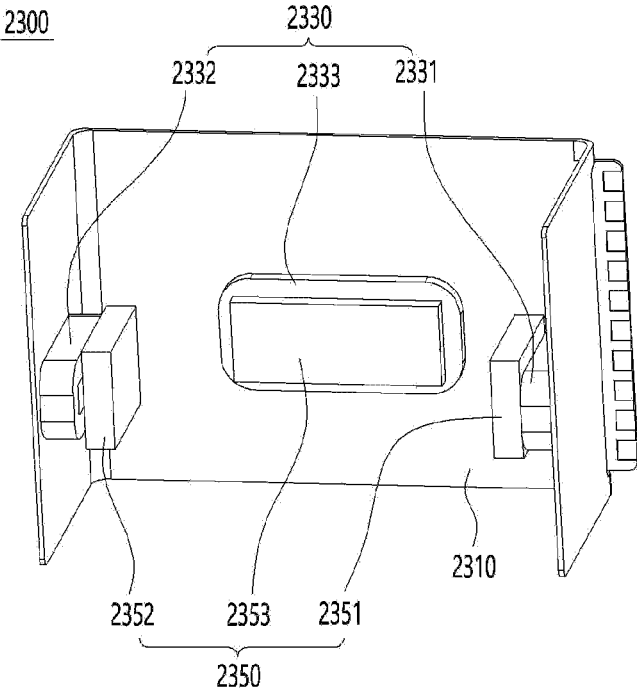
【FIG. 24】
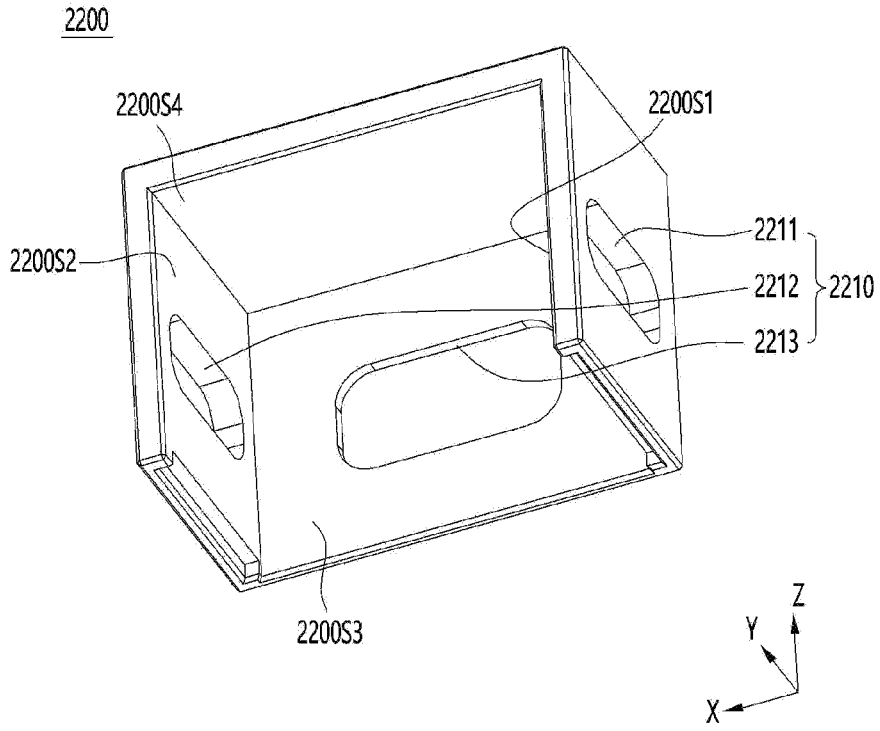

【FIG. 25】
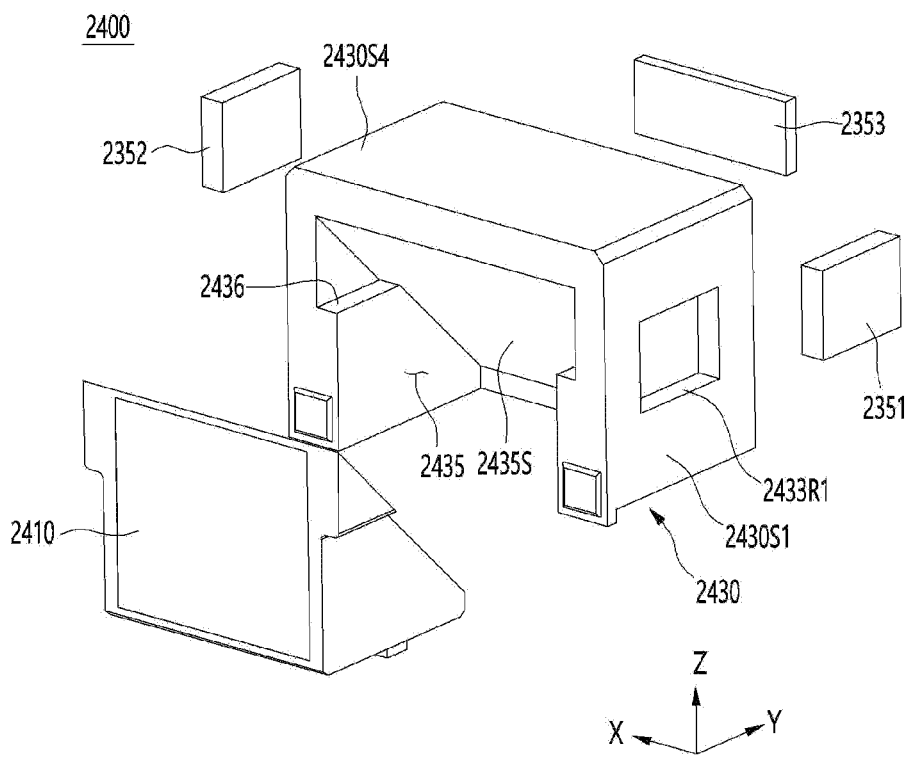
【FIG. 26】
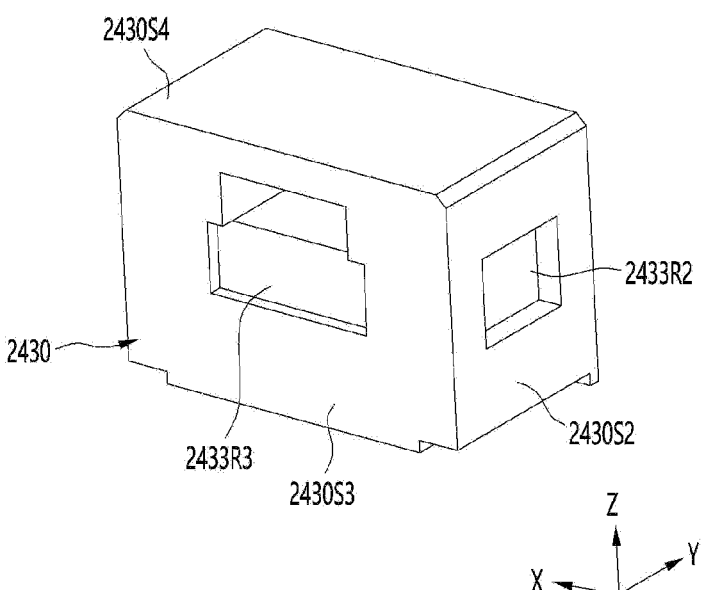

【FIG. 27】
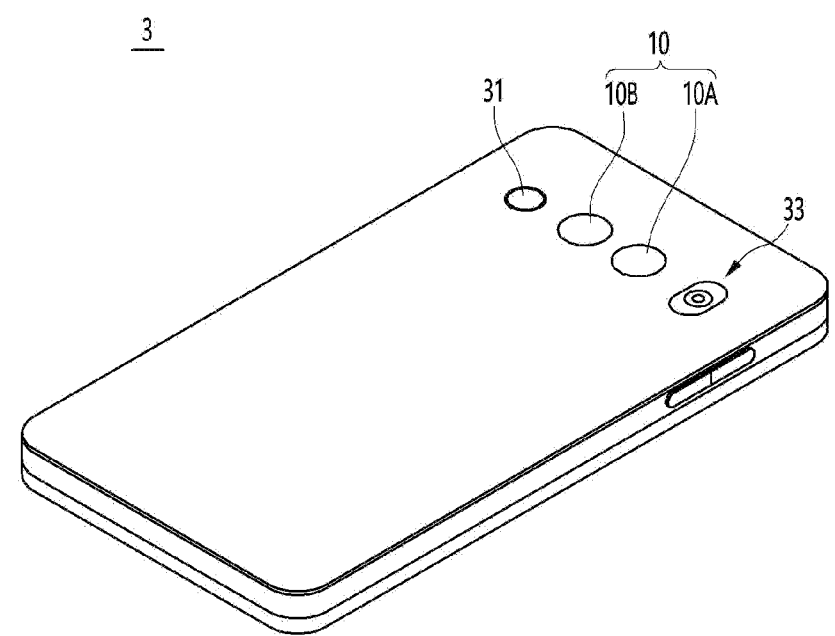

【FIG. 28】
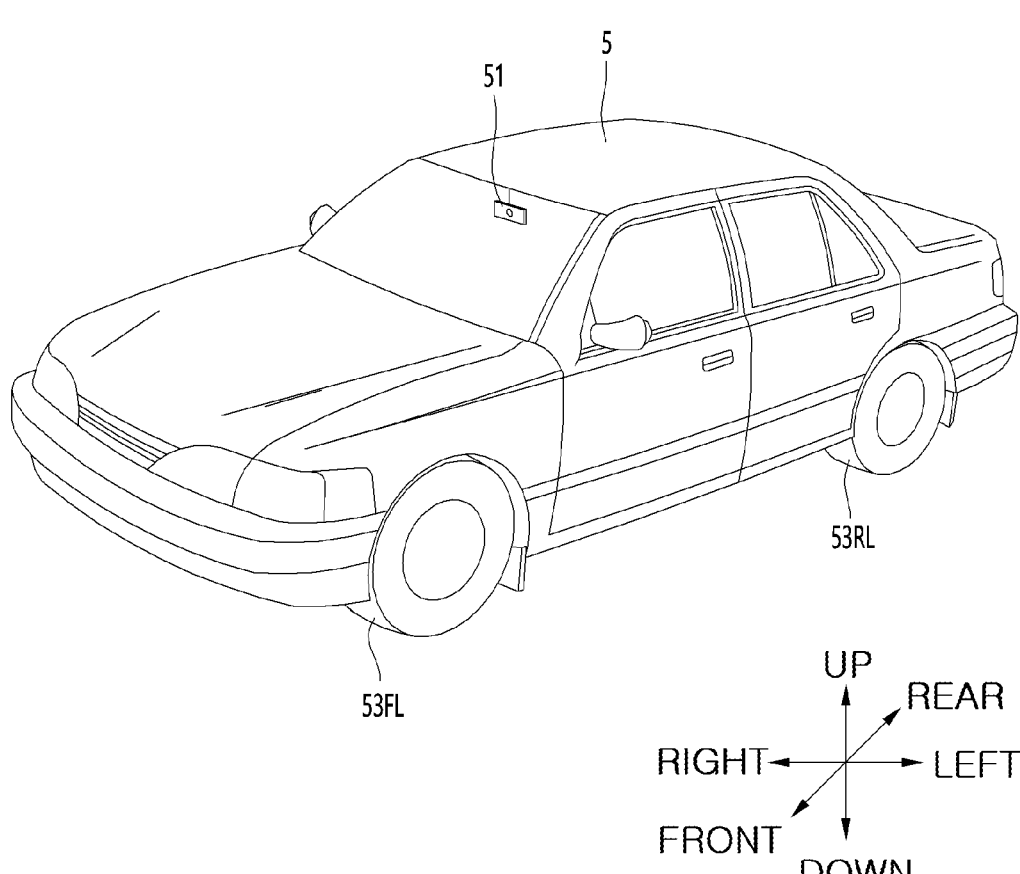

CAMERA ACTUATOR AND CAMERA MODULE INCLUDING SAME

CROSS REFERENCE TO RELATED APPLICATIONS

This application is the National Phase of PCT International Application No. PCT/KR2021/004930, filed on Apr. 20, 2021, which claims priority under 35 U.S.C. 119(a) to Patent Application No. 10-2020-0047493, filed in the Republic of Korea on Apr. 20, 2020, all of which are hereby expressly incorporated by reference into the present application.

TECHNICAL FIELD

An embodiment relates to a camera actuator and a camera module.

BACKGROUND ART

A camera module captures a subject and stores it as an image or video, and is installed in various devices such as mobile terminals such as cell phones, laptops, drones, and vehicles.

In general, the device described above is equipped with a miniature camera module, and the camera module can perform an autofocus (AF) function of automatically adjusting the distance between the image sensor and the lens to align the focal lengths of the lenses. In addition, the camera module may perform a zooming function of zooming up or zooming out by increasing or decreasing the magnification of a distant subject through a zoom lens.

In addition, recent camera modules employ image stabilization (IS) technology to correct or prevent image stabilization due to camera movement caused by an unstable fixing device or a user's movement.

Such image stabilization (IS) technology includes an optical image stabilizer (OIS) technology and an image stabilization prevention technology using an image sensor. Here, OIS technology is a technology that corrects motion by changing the path of light, and the image stabilization prevention technology using the image sensor is a technology that compensates for motion in both mechanical and electronic ways, and recently, OIS technology is being adopted more and more.

Meanwhile, a zoom actuator is used for a zooming function in the camera module. Such an actuator moves the positions of a plurality of zoom lens groups for autofocusing and change of zoom magnification.

At this time, the actuator must accurately sense the current positions of the plurality of zoom lens groups in order to move the positions of the plurality of zoom lens groups, and accordingly move the plurality of zoom lens groups to the target positions.

Accordingly, the conventional camera module includes a sensing part for sensing the position of the zoom lens group.

For example, the sensing part may include a Hall sensor and a single-pole magnet. At this time, the camera module needs a stroke of 5 to 10 mm or more to realize a high magnification zoom. However, there is a limit to sensing the position of a zoom lens group having a stroke of 5 to 10 mm or more using only the Hall sensor and the single pole magnet.

As another example, the sensing part may include a photo interrupter (PI) sensor. However, when the position of the lens group is sensed using the PI sensor, light generated from the PI sensor may enter the image sensor, but there is a problem in that image quality deterioration such as flare occurs. In addition, the PI sensor as described above is difficult to miniaturize, and accordingly, there is a limit in application to a camera module mounted on a terminal.

In addition, in the conventional camera module, an initial position of the lens group is measured using a mechanical stopper. However, there is a problem in that the accuracy of the initial position measurement of the lens group using the mechanical stopper decreases due to injection conditions and assembly deviations of various components included in the camera module.

Therefore, a new camera module capable of solving the above problems is required.

DISCLOSURE

Technical Problem

An embodiment provides a camera actuator and a camera module having improved optical properties.

In addition, the embodiment provides a camera actuator and a camera module capable of autofocus and high magnification zoom.

In addition, the embodiment provides a camera actuator and a camera module capable of accurately sensing a current position of a lens group.

In addition, the embodiment provides a camera actuator and a camera module that can precisely move the lens group to an initial position.

In addition, the embodiment provides a camera actuator and a camera module capable of preventing problems such as de-centering, tilting, friction, etc. occurring when a lens group is moved.

In addition, the embodiment provides a camera actuator and a camera module that can have improved process efficiency.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A lens driving device according to an embodiment includes a moving part including a lens; a driving part for driving the moving part in an optical axis direction; and a sensing part for sensing a position of the moving part; wherein the moving part includes: a magnet scaler in which a first pole and a second pole are alternately arranged in a first direction; and a reference magnet corresponding to the magnet scaler and having a first pole and a second pole disposed in a second direction perpendicular to the first direction.

In addition, the reference magnet is a single magnet.

In addition, the first pole of the reference magnet is disposed to face at least one of the first pole and the second pole of the magnet scaler.

In addition, the magnet scaler and the reference magnet are coupled to each other.

In addition, the sensing part outputs a first sensing signal corresponding to a movement position of the reference magnet and a second sensing signal corresponding to a movement position of the magnet scaler; wherein the first sensing signal is a sensing value for moving the moving part to an initial position, and wherein the second sensing signal is a sensing value for moving the moving part to a target position within a movement stroke of the moving part.

In addition, the lens driving device further includes a housing, wherein the housing includes a hole in which at least a portion of the sensing part is disposed, and wherein the magnet part and the sensing part overlaps to each other in the second direction.

In addition, the hole includes: a first sub hole corresponding to the magnet scaler, and a second sub hole corresponding to the reference magnet, wherein the sensing part includes: a first sub sensing part disposed to face the magnet scaler with respect to the first sub hole; and a second sub sensing part disposed to face the reference magnet with respect to the second sub hole.

In addition, the lens driving device further includes a substrate disposed on an outer peripheral surface of the housing, wherein at least a portion of the sensing part is positioned in the hole in a state in which the sensing part is disposed on the substrate.

In addition, the lens driving device further includes a fixed part disposed in the housing and including a first lens part, wherein the moving part includes: a first lens barrel disposed to be spaced apart from the fixed part in the optical axis direction in the housing; and a second lens barrel disposed to be spaced apart from the moving part in the optical axis direction in the housing, wherein the driving part includes: a first driving part coupled to the first lens barrel in the housing and driving the first lens barrel in the optical axis direction; and a second driving part coupled to the second lens barrel in the housing and driving the second lens barrel in the optical axis direction; wherein the magnet part includes: a first magnet part including a first magnet scaler and a first reference magnet disposed on one surface of the first lens barrel; and a second magnet part including a second magnet scaler and a second reference magnet disposed on the other surface of the second lens barrel, wherein the sensing part includes: a first sensing part disposed adjacent to the first magnet part; and a second sensing part disposed adjacent to the second magnet part.

In addition, the housing includes: a first housing in which the fixed part is disposed; and a second housing in which the first lens barrel and the second lens barrel are disposed, wherein the hole includes: a first hole formed on a lower surface of the second housing and vertically overlapping with the first magnet part and the first sensing part; and a second hole disposed on an upper surface of the second housing and vertically overlapping with the second magnet part and the second sensing part.

In addition, the first lens barrel includes a first barrel part including a second lens part; a first guide part extending outwardly from the first barrel part; and a first elastic part connected to the first driving part, wherein the second lens barrel includes: a second barrel part including a third lens part; a second guide part extending outwardly from the second barrel part; and a second elastic part connected to the second driving part.

In addition, the first driving part includes a first piezoelectric device disposed in the housing; and a first extension bar extending in the optical axis direction from the first piezoelectric device, wherein the second driving part includes a second piezoelectric device disposed in the housing; and a second extension bar extending in the optical axis direction from the second piezoelectric device, wherein one region of the first extension bar is connected to the first elastic part, and wherein one region of the second extension bar is connected to the second elastic part.

In addition, the lens driving device includes first and second pins extending in the optical axis direction within the housing and spaced apart from each other, wherein the first pin is disposed to be inserted into a first insertion hole of the first lens barrel, wherein the second pin is disposed to be inserted into a second insertion hole of the second lens barrel, wherein the first lens barrel moves along the first pin, and wherein the second lens barrel moves along the second pin.

In addition, the first lens barrel further includes a first guide groove in which the second pin is disposed, and the second lens barrel further includes a second guide groove in which the first pin is disposed, and wherein each of the first and second guide grooves has an open shape at one side.

In addition, the first magnet part is a first single magnetized magnet in which the first magnet scaler and the first reference magnet are integrally formed, and wherein the second magnet part is a second single magnetized magnet in which the second magnet scaler and the second reference magnet are integrally formed.

On the other hand, the lens driving device according to the embodiment includes a lens barrel including a lens; a piezo driving part for driving the lens barrel in an optical axis direction; a magnet part disposed on the lens barrel; and a sensing part corresponding to the magnet part, wherein the magnet part includes: a magnet scaler in which a first pole and a second pole are alternately disposed in an optical axis direction; and a reference magnet corresponding to the magnet scaler and having a first pole and a second pole disposed in a direction perpendicular to the optical axis direction.

In addition, the reference magnet is a single magnet including a first pole disposed to face at least one of the first pole and the second pole of the magnet scaler.

In addition, the sensing part outputs a first sensing signal corresponding to a movement position of the reference magnet and a second sensing signal corresponding to a movement position of the magnet scaler; wherein the first sensing signal is a sensing value for moving the moving part to an initial position, and wherein the second sensing signal is a sensing value for moving the moving part to a target position within a movement stroke of the moving part.

On the other hand, the camera device according to the embodiment includes a first lens barrel including a first lens part, a second lens barrel including a second lens part spaced apart from the first lens part in an optical axis direction, and a third lens barrel including a third lens part spaced apart from the second lens part in the optical axis direction; a first driving part for driving the second lens barrel in the optical axis direction; a second driving part for driving the third lens barrel in the optical axis direction; a first magnet part including a first magnet scaler and a first reference magnet disposed on one surface of the second lens barrel; a second magnet part including a second magnet scaler and a second reference magnet disposed on the other surface of the third lens barrel; a first sensing part configured to acquire a first sensing signal corresponding to a change in magnetic force of the first magnet part; a second sensing part configured to acquire a second sensing signal corresponding to a change in magnetic force of the second magnet part; and a controller configured to control movement of the second lens barrel and the third lens barrel based on the first and second sensing signals.

In addition, the controller outputs a control signal for moving the first lens barrel to an initial position and a target position to the first driving part based on the first sensing signal acquired through the first sensing part, and outputs a control signal for moving the second lens barrel to an initial position and a target position to the second driving part based on a second sensing signal acquired through the second sensing part.

In addition, the first sensing part includes: a first-first sub sensing part configured to acquire a first sensing signal corresponding to a change in magnetic force of the first reference magnet; and a first-second sensing part for obtaining a second sensing signal corresponding to a change in magnetic force of the first magnet scaler, wherein the second sensing part includes a second-first sub sensing part configured to acquire a third sensing signal corresponding to a change in magnetic force of the second reference magnet; and a second-second sub sensing part configured to acquire a fourth sensing signal corresponding to a change in magnetic force of the second magnet scaler.

In addition, the controller moves the first lens barrel to an initial position based on the first sending signal, moves the first lens barrel to a target position based on the second sensing signal, moves the second lens barrel to an initial position based on the third sensing signal, and moves the second lens barrel to a target position based on the fourth sensing signal.

Advantageous Effects

The camera actuator and the camera module according to the embodiment may have improved optical properties. In detail, the camera actuator and the camera module according to the embodiment include a driving part for driving the lens group including a piezoelectric device, the lens group can be more precisely controlled by the driving part, and friction generated when the lens group is moved can be minimized. Accordingly, the embodiment may provide more improved autofocus and zoom functions.

In addition, the camera actuator and the camera module according to the embodiment may have improved operational reliability. In detail, the embodiment includes a first magnet part and a second magnet part mounted on the lens barrel. In this case, the first magnet part may include a reference magnet, and the second magnet part may include a magnet scaler. Also, the embodiment may include a sensing part disposed adjacent to the first magnet part and the second magnet. The sensing part may measure a change in a magnetic field by the first magnet part and the second magnet part. That is, the sensing part may precisely move the lens group to the initial position by using the change in the magnetic field by the first magnet part. Also, the sensing part may precisely move the lens group to the target position by using the change in the magnetic field by the second magnet part. Accordingly, the embodiment may improve the accuracy of the autofocus and zoom functions of the camera module, and thus the operation reliability may be improved.

In addition, the camera actuator and the camera module according to the embodiment can eliminate assembly deviation. In detail, although the embodiment includes the first magnet part and the second magnet part, this may be an integrally formed magnet part. That is, the integrally formed magnet part may be a magnet configured by magnetizing a magnet scaler corresponding to the second magnet part and a reference magnet corresponding to the first magnet part at once. Therefore, according to the embodiment, it is possible to solve the position erroneous detection that occurs due to the assembly deviation between the magnet scaler and the reference magnet, and thus the operation reliability can be further improved.

In addition, the camera actuator and the camera module according to the embodiment enable the position of the lens group to be sensed using a magnet scaler and a reference magnet rather than a conventional PI sensor, so that the position of the lens group can be sensed without image deterioration and thus image quality can be improved.

In addition, the camera actuator and the camera module according to the embodiment may have improved process efficiency. In detail, the camera actuator and the camera module according to the embodiment include a housing accommodating a plurality of lens groups, for example, a plurality of lens barrels, and a guide jaw may be disposed on an inner lower surface of the housing facing the lens barrel. In this case, the guide jaw may have a position and a distance corresponding to a set lens barrel among the plurality of lens barrels, thereby preventing an unset lens barrel from being disposed. Accordingly, it is possible to effectively arrange the set lens barrels at the set positions, and it is possible to prevent other lens barrels from being misplaced. Accordingly, the embodiment may reduce defects caused by misalignment of the plurality of lens barrels, and may have improved process efficiency.

DESCRIPTION OF DRAWINGS

FIG. 1 is a perspective view of a camera actuator according to an embodiment.

FIG. 2 is an exploded perspective view of a camera actuator according to an embodiment.

FIG. 3 is a cross-sectional view of a camera actuator according to an embodiment.

FIG. 4 is a front view of a camera actuator according to an embodiment.

FIG. 5 is a perspective view illustrating first and second driving parts disposed in a housing in a camera actuator according to an embodiment.

FIG. 6 is an exploded perspective view of a first driving part according to an embodiment.

FIG. 7 is an exploded perspective view of a second driving part according to an embodiment.

FIG. 8 is a perspective view of a part of a camera actuator according to an embodiment.

FIG. 9 is an exploded perspective view of a housing according to an embodiment.

FIG. 10 is a front view of a second housing according to an embodiment.

FIG. 11 is a front view of a second driving part disposed in a second housing according to an exemplary embodiment.

FIG. 12 is a front view of first and second driving parts disposed in a second housing according to an exemplary embodiment.

FIG. 13 is a view illustrating first and second driving parts according to an embodiment.

FIG. 14 is a front view of a second driving part disposed in a second housing according to another exemplary embodiment.

FIG. 15 is a view illustrating a sensing signal acquired through a sensing part according to an exemplary embodiment.

FIG. 16 is a view illustrating the second sensing signal shown in FIG. 15 in more detail.

FIG. 17 is a view illustrating a sensing signal acquired through a sensing part according to another exemplary embodiment.

FIG. 18 is a flowchart for explaining an initial operation method of a camera module according to an embodiment.

FIG. 19 is a flowchart for explaining a method of operating a function of a camera module according to an embodiment.

FIG. 20 is a perspective view of a camera module according to an embodiment.

FIG. 21 is a perspective view in which some components are omitted in a camera module according to an embodiment.

FIG. 22 is an exploded perspective view of a second camera actuator according to an embodiment.

FIG. 23 is a view of a third driving part of a second camera actuator according to an embodiment.

FIG. 24 is a view of a third housing of a second camera actuator according to an embodiment.

FIGS. 25 and 26 are views of a prism unit of a second camera actuator according to an embodiment.

FIG. 27 is a perspective view of a mobile terminal to which a camera module according to an embodiment is applied.

FIG. 28 is a perspective view of a vehicle to which a camera module according to an embodiment is applied.

MODES OF THE INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and substituted for use.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

An optical axis direction used below may be defined as an optical axis direction of a lens coupled to a camera actuator and a camera module, and a vertical direction may be defined as a direction perpendicular to the optical axis.

A autofocus function used below may be defined a function to automatically focus on the subject by adjusting the distance from the image sensor by moving the lens in the optical axis direction according to the distance of the subject so that a clear image of the subject can be acquired by the image sensor.

Meanwhile, the auto focus may correspond to auto focus (AF). In addition, closed-loop auto focus (CLAF) control may be defined as real-time feedback control of the lens position by sensing the distance between the image sensor and the lens to improve focus adjustment accuracy.

In addition, before the description of the embodiment of the invention, a first direction may mean a x-axis direction shown in the drawings, a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, the configuration of the camera module according to the present embodiment will be described with reference to the drawings.

FIG. 1 is a perspective view of a camera actuator according to an embodiment, FIG. 2 is an exploded perspective view of a camera actuator according to an embodiment, FIG. 3 is a cross-sectional view of a camera actuator according to an embodiment, FIG. 4 is a front view of a camera actuator according to an embodiment, FIG. 5 is a perspective view illustrating first and second driving parts disposed in a housing in a camera actuator according to an embodiment, FIG. 6 is an exploded perspective view of a first driving part according to an embodiment, FIG. 7 is an exploded perspective view of a second driving part according to an embodiment, FIG. 8 is a perspective view of a part of a camera actuator according to an embodiment.

Referring to FIGS. 1 to 8, the camera actuator 1000 according to the embodiment may include a housing 100, a first lens part 105, a first lens barrel 200, a first driving part 300, a second lens barrel 400 and a second driving part 500.

The housing 100 may form the exterior of the camera actuator 1000. The housing 100 may have upper and lower partial regions open and may have a hexahedral shape.

The housing 100 may include an accommodating space therein. The first lens barrel 200, the first driving part 300, the second lens barrel 400, and the second driving part 500 may be accommodated in the accommodating space of the housing 100.

Here, the first lens part 105 is disposed in a fixed position within the housing 100, and accordingly, it may be referred to as a 'fixed part'. In addition, the positions of the first lens barrel 200 and the second lens barrel 400 may be moved within the housing 100 for a zoom function or an autofocus function, and accordingly, this may be referred to as a 'moving part'.

The housing 100 may include a first housing 110 and a second housing 120.

The first housing 110 may include a first hole 111. The first hole 111 may be formed on one side of the first housing 110. The first hole 111 may be a hollow hole passing through an outside and an inside of the first housing 110.

The first housing 110 may further include a second hole 112 and a third hole 113. The second hole 112 and the third hole 113 may be disposed on one side of the first housing 110. The second hole 112 and the third hole 113 may be hollow holes passing through the outside and the inside of the first housing 110. The second hole 112 and the third hole 113 may be spaced apart from the first hole 111.

In detail, the first hole 111 may be disposed between the second hole 112 and the third hole 113. The first hole 111 may be disposed at equal intervals to the second hole 112 and the third hole 113.

The second hole 112 may include a plurality of protrusions protruding from an inner circumferential surface of the second hole 112 toward a center of the second hole 112. For example, the plurality of protrusions may include a first protrusion 112a disposed at an upper end of the second hole 112 and a second protrusion 112b disposed at a lower end of the second hole 112 in the optical axis direction.

In detail, the first protrusion 112a may include a plurality of first sub-protrusions (not shown) spaced apart from each other. The plurality of first sub-protrusions may be arranged at equal intervals from the center of the second hole 112 along a circumference of a concentric circle shape. Also, the second protrusion 112b may be spaced apart from the first protrusion 112a in the optical axis direction. The second protrusion 112b may be disposed below the first protrusion 112a. The second protrusion 112b may include a plurality of second sub-protrusions (not shown) spaced apart from each other. The plurality of second sub-protrusions may be arranged at equal intervals from the center of the second hole 112 along a circumference of a concentric circle shape. The first protrusion 112a and the second protrusion 112b may provide a space in which a portion of the first driving part 300 to be described later, for example, a first buffer member 321 is disposed.

The third hole 113 may include a plurality of protrusions protruding from the inner circumferential surface of the third hole 113 toward the center of the third hole 113. The plurality of protrusions may include a third protrusion 113a disposed at an upper end of the third hole 113 and a fourth protrusion 1134 disposed at a lower end of the second hole 112 with respect to the optical axis direction.

The third protrusion 113a may include a plurality of third sub-protrusions (not shown) spaced apart from each other. The plurality of third sub-protrusions may be arranged at equal intervals from the center of the third hole 113 along the circumference of a concentric circle. Also, the fourth protrusion 1134 may be spaced apart from the third protrusion 113a in the optical axis direction. The fourth protrusion 1134 may include a plurality of fourth sub-protrusions (not shown) spaced apart from each other. The plurality of fourth sub-protrusions may be arranged at equal intervals from the center of the third hole 113 along the circumference of a concentric circle. The third protrusion 113a and the fourth protrusion 1134 may provide a space in which a portion of the second driving part 500 to be described later, for example, a third buffer member 521 is disposed.

The second housing 120 may be disposed under the first housing 110. In detail, the second housing 120 may be disposed under the first housing 110 in a third direction (z-axis, optical-axis direction). The second housing 120 may be disposed closer to the image sensor 900 to be described later than the first housing 110. The first lens barrel 200, the first driving part 300, the second lens barrel 400, and the second driving part 500 may be disposed in the second housing 120.

The second housing 120 may be coupled to the first housing 110. For example, the first housing 110 and the second housing 120 may be coupled by a separate fastening member (not shown) such as a screw. In addition, the first housing 110 and the second housing 120 may be coupled to each other by physical coupling of coupling jaws and coupling grooves respectively formed therein.

The second housing 120 may include a plurality of holes. As an embodiment, the second housing 120 may include at least one hole formed in a region overlapping a magnet part, which will be described later, in the second direction (or the y-axis direction).

Specifically, the second housing 120 may include a first hole (to be described later) formed in a region overlapping the magnet parts 610 and 615 disposed in the first lens barrel 200 in the second direction. Also, the second housing 120 may include a second hole (to be described later) formed in a region overlapping with the magnet parts 620 and 625 disposed in the second lens barrel 400 in the second direction. The first hole may correspond to at least a portion of the magnet parts 610 and 615. Also, the second hole may correspond to at least a portion of the magnet parts 620 and 625. At this time, the magnet parts 610 and 615 included in the first lens barrel 200 are disposed below the first lens barrel 200, and accordingly, the first hole may be formed at a lower side of the second housing 120. In addition, the magnet parts 620 and 625 included in the second lens barrel 400 are disposed on the second lens barrel 400, and accordingly, the second hole may be formed on an upper side of the second housing 120. This will be described in more detail below.

The first lens part 105 is disposed in the housing 100 and may include at least one lens. For example, the first lens part 105 may be disposed in the first housing 110. In detail, the first lens part 105 may be disposed in the first hole 111 of the first housing 110. For example, the first lens part 105 may be coupled to the first housing 110 by a thread formed on an inner circumferential surface of the first hole 111.

The first lens barrel 200 may be disposed in the housing 100. The first lens barrel 200 may be disposed in the second housing 120. The first lens barrel 200 may be disposed under the first lens part 105. For example, the first lens barrel 200 may be disposed below the first lens part 105 in the optical axis direction, and may be closer to the image sensor 900 than the first lens part 105. The first lens barrel 200 may be coupled to the first driving part 300. The first lens barrel 200 may be moved in the housing 100 by the first driving part 300. In detail, the first lens barrel 200 may be moved in the optical axis direction by the first driving part 300.

The first lens barrel 200 may include a first barrel part 210, a second lens part 205, a first guide part 220, and a first elastic part 230.

The first barrel part 210 may be disposed in a region overlapping the optical axis and may have an open shape on one surface and the other surface. For example, the first barrel part 210 may have a cylindrical shape in which one surface and the other surface are open.

The first barrel part 210 may include the first through hole 211. The first through hole 211 may be a through hole penetrating through one surface and the other surface of the first barrel part 210. Here, one surface of the first barrel part 210 may be a surface facing the first lens part 105, and the other surface may be a surface opposite to the one surface and facing the image sensor 900.

The second lens part 205 may be disposed on the first barrel part 210. In detail, the second lens part 205 may be disposed in the first through hole 211. For example, a thread may be formed on an inner circumferential surface of the first through hole 211, and the second lens part 205 may be coupled to the first barrel part 210 by the thread.

The second lens part 205 may include at least one lens. The second lens part 205 may perform a zoom function. The second lens part 205 may move in the optical axis direction. In detail, the second lens part 205 may move in the optical axis direction with respect to the first lens part 105.

The first guide part 220 may extend outwardly from the first barrel part 210. For example, the first guide part 220 may extend from the first barrel part 210 in a direction perpendicular to the optical axis, for example, in a first direction (x-axis direction).

The first guide part 220 may include a first upper surface 211, a first side surface 222, and a first lower surface 223.

The first upper surface 221 may face an inner upper surface 122 of the housing 100 to be described later. The first upper surface 221 may face the inner upper surface 122 of the housing 100 in the second direction (y-axis direction). The first upper surface 221 may include a plurality of sub upper surfaces. In detail, the first upper surface 221 may include a first sub upper surface 221a and a second sub upper surface 221b disposed lower in the second direction (y-axis direction) than the first sub upper surface 221a. That is, the second sub upper surface 221b may be disposed adjacent to the first lower surface 223 than the first sub upper surface 221a. At least one first fastening protrusion (not shown) may be disposed on the second sub upper surface 221b. The first fastening protrusion may have a shape protruding upward on the second sub upper surface 221b. The first fastening protrusion may be inserted into a first fixing groove (not shown) formed in a first elastic part 230 to be described later.

Also, the first upper surface 221 may include a first stepped surface 225 disposed between the first sub upper surface 221a and the second sub upper surface 221b. The first stepped surface 225 may be connected to ends of the first sub upper surface 221a and the second sub upper surface 221b. The first stepped surface 225 may be defined as the first stepped portion 225. That is, the first upper surface 221 may include the first sub upper surface 221a, the second sub upper surface 221b, and the first stepped portion 225 and may have a stepped structure.

The first lower surface 223 may face the inner lower surface 121 of the housing 100 to be described later. A first groove 2231 may be disposed on the first lower surface 223. The first groove 2231 may have a concave shape in a direction from the first lower surface 223 to the first upper surface 221. The first groove 2231 may have a T-shape, but is not limited thereto. A first magnet part 610 and 615 to be described later may be disposed in the first groove 2231. Specifically, a first-first magnet 610 and a first-second magnet 615 to be described later may be disposed in the first groove 2231. Accordingly, the first groove 2231 may include a first-first sub groove in which the first-first magnet 610 is disposed, and a first-second sub-groove in which the first-second magnets 615 are disposed. The first-first sub groove and the first-second sub groove may be connected to each other, and differently, they may be partitioned by a partition wall formed in a middle. Meanwhile, although it is illustrated that the first groove 2231 has a T-shape in the drawing and the first magnet part 610 and 615 is disposed therein, the embodiment is not limited thereto. In detail, the first-second sub groove of the first groove 2231 may be formed to have the same area as the first-first sub groove so as to enlarge a length of a neutral zone around the first-second magnet 615. For example, a sum of a size of the first-second magnet 615 and a size of the neutral zone of the first-second magnet 615 may be the same as the size of the first-first magnet 610, and otherwise it may be larger than this.

The first-first magnet 610 may be a magnet scaler having a structure in which a plurality of magnets having different polarities are sequentially disposed in a third direction corresponding to the optical axis direction. The first-second magnet 615 may be a reference magnet. Also, the first-second magnet 615 may be a single-pole magnet. In detail, the first-second magnets 615 are single-pole magnetized magnets, and accordingly, it may be referred to as 'single-pole magnets'. In addition, the first-second magnet 615 is provided to move the lens barrel to an initial position as a reference, and accordingly, it may be referred to as a 'reference magnet'. Hereinafter, this will be described as a single-pole magnet.

The first-first magnet 610 may be disposed adjacent to the first-second magnet 615. For example, the first-first magnet 610 may be disposed in direct contact with the first-second magnet 615 in the first groove 2231. As another example, the first-first magnet 610 may be disposed to be spaced apart from the first-second magnet 615 in the first groove 2231 by a predetermined interval.

The first-first magnet 610 and the first-second magnet 615 may be separated from each other. That is, the first-first magnet 610 and the first-second magnet 615 may be a magnet scaler and a single-pole magnet manufactured by being individually magnetized to each other.

Also, the first-first magnet 610 and the first-second magnet 615 may be integrally formed with each other. That is, the first-first magnet 610 and the first-second magnet 615 may be an integrated magnet formed by being magnetized at once.

In addition, a second groove 2232 may be disposed on the first lower surface 223. The second groove 2232 may be spaced apart from the first groove 2231. The second groove 2232 may be disposed in an edge region of the first lower surface 223. The second groove 2232 may provide a region in which a portion of the first elastic part 230, which will be described later, is disposed. In detail, the second groove 2232 may provide a region in which the first elastic part 230 is mounted and fixed.

The first side surface 222 may be disposed between the first upper surface 221 and the first lower surface 223. In detail, the first side surface 222 may be a surface connecting the first upper surface 221 and the first lower surface 223. In more detail, the first side surface 222 may be a surface connecting the second sub upper surface 221b and the first lower surface 223. The first side surface 222 may face a second inner surface 124 of the second housing 120 to be described later.

A first recess 2221 may be disposed on the first side surface 222. The first recess 2221 may have a concave shape in a direction from the first side surface 222 to the first barrel part 210. Also, the first recess 2221 may have a groove shape extending in the optical axis direction (z-axis direction). The first recess 2221 may have a V-shape when viewed from the front.

The first guide part 220 may include a first insertion hole 220h1. The first insertion hole 220h1 may be a hole passing through one surface and the other surface of the first guide part 220. Here, one surface of the first guide part 220 may be a surface facing the first lens part 105, and the other surface may be a surface opposite to the one surface and facing the image sensor 900.

A first pin 250 may be disposed in the first insertion hole 220*h*1. The first pin 250 may be disposed to pass through the first insertion hole 220*h*1. The first pin 250 has a shape extending in the optical axis direction (z-axis direction), and may have a longer optical axis direction length than the first lens barrel 200. The first pin 250 may be coupled to at least one of the first housing 110 and the second housing 120. The first lens barrel 200 may move the first pin 250 as a movement axis in the optical axis direction. Through this, the second lens part 205 disposed in the first lens barrel 200 may perform a zoom function and/or an autofocus function.

The first elastic part 230 may be disposed on the first guide part 220. For example, the first elastic part 230 may be disposed on the first upper surface 221, the first lower surface 223, and the first side surface 222 of the first guide part 220. The first elastic part 230 may be coupled to the first guide part 220.

The first elastic part 230 may include a first elastic member 231 and a second elastic member 232.

The first elastic member 231 may be coupled to the first guide part 220. The first elastic member 231 may be disposed at a set position on the first side surface 222.

The first elastic member 231 may have a shape corresponding to the first side surface 222. For example, the first elastic member 231 may include a first region 231*a*, a second region 231*b*, and a third region 231*c*.

The first region 231*a* and the second region 231*b* may be disposed on the first side surface 222 of the first guide part 220 and may be spaced apart from each other. The first region 231*a* and the second region 231*b* may be disposed on a region of the first side surface 222 in which the first recess 2221 is not disposed.

The third region 231*c* may be disposed between the first region 231*a* and the second region 231*b* to connect the two regions 231*a* and 231*b*. The third region 231*c* may be disposed in a region corresponding to the first recess 2221. The third region 231*c* may have a V-shape corresponding to the first recess 2221.

The second elastic member 232 may be disposed on the first guide part 220. The second elastic member 232 may be coupled to the first guide part 220.

The second elastic member 232 may include a fourth region 232*a*, a fifth region 232*b*, and a sixth region 232*c*.

The fourth region 232*a* may be disposed on the first upper surface 221 of the first guide part 220. In detail, the fourth region 232*a* may be disposed on the second sub upper surface 221*b* of the first guide part 220. The fourth region may include a first fixing groove (not shown). The first fixing groove may be disposed in a region corresponding to the first fastening protrusion, and may have a shape corresponding to the first fastening protrusion.

The fifth region 232*b* may be connected to the fourth region 232*a*. For example, the fifth region 232*b* may be bent at one end of the fourth region 232*a* and disposed on the first side surface 222 of the first guide part 220. The fifth region 232*b* may be disposed on the first elastic member 231. The fifth region 232*b* may be parallel to the first region 231*a* and the second region 231*b*. The fifth region 232*b* may be disposed to cover the first elastic member 231.

The sixth region 232*c* may be connected to the fifth region 232*b*. For example, the sixth region 232*c* may be bent at one end of the fifth region and disposed on the first lower surface 223 of the first guide part 220. A portion of the sixth region

232*c* may be inserted into the second groove 2232 disposed on the first lower surface 223.

That is, the second elastic member 232 may be physically coupled to the first guide part 220 as the first fixing groove formed in the fourth region 232*a* engages with the first fastening protrusion, the sixth region 232*c* is inserted into the second groove 2232. Accordingly, the first elastic part 230 may maintain a state firmly coupled to the first guide part 220.

In addition, the first lens barrel 200 may further include a first guide groove (210*h*1). The first guide groove 210*h*1 may be disposed in a region extending outwardly from the first barrel part 210. The first guide groove 210*h*1 may be disposed in a region corresponding to a second pin 450 to be described later. The first guide groove 210*h*1 may provide a space into which the second pin 450 is inserted. The first lens barrel 200 may move in the optical axis direction by the first pin 250 and the second pin 450. In this case, the first guide groove 210*h*1 may have an open shape at one side. For example, the first guide groove 210*h*1 may have an open shape at one side facing the first inner surface of the housing 100. Accordingly, friction and vibration generated when the first lens barrel 200 is moved by the first driving part 300 can be minimized.

The camera actuator 1000 may include a first driving part 300. The first driving part 300 may be disposed in the housing 100. The first driving part 300 may be coupled to the first lens barrel 200. The first driving part 300 may move the first lens barrel 200 in the optical axis direction (z-axis direction).

The first driving part 300 may include a first piezoelectric device 310, a first extension bar 320, a first buffer member 321, and a second buffer member 322.

The first piezoelectric device 310 may include a piezo-electric device. For example, the first piezoelectric device 310 may include a material that causes mechanical deformation by an applied voltage. The first piezoelectric device 310 may contract or expand by an applied voltage and may cause mechanical deformation in a set direction. For example, the first piezoelectric device 310 may generate a vibration while causing mechanical deformation in the optical axis direction (z-axis direction) by an applied voltage.

The first piezoelectric device 310 may include a first disk portion 311 and a first protrusion 512. The first disk portion 311 may have a plate shape and may be disposed on the second hole 112. For example, the first disk portion 311 may be disposed on the first protrusion 112*a* of the second hole 112. In detail, the first disk portion 311 may be disposed on the plurality of first sub-protrusions. The first protrusion 112*a* may support the first disk portion 311.

The first protrusion 512 may be disposed under the first disk portion 311. In detail, the first protrusion 512 may be disposed under the first disk portion 311 in the third direction (z-axis direction) and may be connected to the first disk portion 311. A portion of the first protrusion 512 may be disposed in the second hole 112. The first protrusion 512 may have a shape protruding toward the image sensor 900. A width (x-axis, y-axis direction) of the first protrusion 512 may change toward the optical axis direction. For example, the width of the first protrusion 512 may decrease as it approaches the image sensor 900.

The first extension bar 320 may extend in the optical axis direction. The first extension bar 320 may be disposed parallel to the optical axis and may be connected to the first piezoelectric device 310. For example, an upper end of the first extension bar 320 may be connected to the first protrusion 512. In addition, the lower end of the first extension bar 320 may be inserted into the lower end of the housing 100, for example, a fourth hole (not shown) formed at the lower end of the second housing 120.

In addition, one region of the first extension bar 320 may be connected to the first lens barrel 200. For example, the first extension bar 320 may be connected to the first lens barrel 200 by the first elastic part 230. In detail, the first extension bar 320 may be disposed between the first elastic member 231 and the second elastic member 232. In more detail, the first extension bar 320 may be disposed between the third region 231c of the first elastic member 231 and the fifth region 232b of the second elastic member 232. The first extension bar 320 may be fixed by the elastic force of the first elastic member 231 and the second elastic member 232.

The first extension bar 320 may transmit the vibration generated by the first piezoelectric device 310 to the first lens barrel 200. The first lens barrel 200 may move upward or downward (z-axis direction, optical-axis direction) according to the vibration direction of the first extension bar 320. Through this, the second lens part 205 in the first lens barrel 200 may move to perform a zooming function of zooming up or zooming out.

The first buffer member 321 may be disposed on the first extension bar 320. The first buffer member 321 may be disposed on an upper region of the first extension bar 320. The first buffer member 321 may be disposed in the second hole 112 of the housing 100. For example, the first buffer member 321 may be disposed between the first protrusion 112a and the second protrusion 112b of the second hole 112. The first buffer member 321 may be fixed to a position set by the first protrusion 112a and the second protrusion 112b. In addition, the first buffer member 321 may include a through hole into which the first extension bar 320 is inserted.

The second buffer member 322 may be disposed on the first extension bar 320. The second buffer member 322 may be disposed on a lower region of the first extension bar 320. The second buffer member 322 may be spaced apart from the first buffer member 321 in the optical axis direction. The second buffer member 322 may be disposed in a fourth hole (not shown) of the housing 100. The second buffer member 322 may be disposed to be inserted into the fourth hole. The second buffer member 322 may include a through hole into which the first extension bar 320 is inserted.

The first buffer member 321 and the second buffer member 322 may prevent noise caused by the vibration of the first extension bar 320. In addition, the first buffer member 321 and the second buffer member 322 may prevent the first extension bar 320 from being deformed or damaged by an external impact.

The second lens barrel 400 may be disposed in the housing 100. The second lens barrel 400 may be disposed in the second housing 120. The second lens barrel 400 may be disposed under the first lens barrel 200. For example, the second lens barrel 400 may be disposed below the first lens barrel 200 in the optical axis direction, and may be closer to the image sensor 900 than the first lens barrel 200. The second lens barrel 400 may be coupled to the second driving part 500. The second lens barrel 400 may be moved in the housing 100 by the second driving part 500. In detail, the second lens barrel 400 may be moved in the optical axis direction by the second driving part 500.

The second lens barrel 400 may include a second barrel part 410, a third lens part 405, a second guide part 420, and a second elastic part 430.

The second barrel part 410 is disposed in a region overlapping the optical axis and may have an open shape on one side and the other side. For example, the second barrel part 410 may have a cylindrical shape in which one surface and the other surface are open.

The second barrel part 410 may include the second through hole 411. The second through hole 411 may be a through hole passing through one surface and the other surface of the second barrel part 410. Here, one surface of the second barrel part 410 may be a surface facing the first lens barrel 200, and the other surface may be a surface opposite to the one surface and facing the image sensor 900.

The third lens part 405 may be disposed on the second barrel part 410. In detail, the third lens part 405 may be disposed in the second through hole 411. For example, a thread may be formed on an inner circumferential surface of the second through hole 411, and the third lens part 405 may be coupled to the second barrel part 410 by the thread.

The third lens part 405 may include at least one lens. The third lens part 405 may perform an auto focus function. The third lens part 405 may move in the optical axis direction. In detail, the third lens part 405 may move in the optical axis direction with respect to the first lens part 105. The third lens part 405 may move separately from the second lens part 205. Also, the distance at which the third lens part 405 can move in the optical axis direction may be the same as or different from that of the second lens part 205.

The second guide part 420 may extend outwardly from the second barrel part 410. For example, the second guide part 420 may extend from the second barrel part 410 in a direction perpendicular to the optical axis, for example, in a first direction (x-axis direction). In this case, the second guide part 420 may extend in a direction opposite to the first guide part 220. For example, the first guide part 220 may extend in the +x-axis direction from the first barrel part 210, and the second guide part 420 may extend in the −x-axis direction from the second barrel part 410.

The second guide part 420 may include a second lower surface 421, a second side surface 422, and a second upper surface 423.

The second upper surface 423 may face the inner upper surface 122 of the housing 100. The second upper surface 423 may face the inner upper surface 122 of the housing 100 in the second direction (y-axis direction). A third groove 4231 may be disposed on the second upper surface 423. The third groove 4231 may have a concave shape in a direction from the second upper surface 423 to the second lower surface 421. A second magnetic scaler 620 to be described later may be disposed in the third groove 4231.

The third groove 4231 may have a T-shape, but is not limited thereto. A second magnet part 620 and 625 to be described later may be disposed in the third groove 4231. Specifically, a second-first magnet 620 and a second-second magnet 625, which will be described later, may be disposed in the third groove 4231. Accordingly, the third groove 4231 may include a second-first sub groove in which the second-first magnet 620 is disposed and a third-second sub-groove in which the second-second second magnet 625 is disposed. The third-first sub groove and the third-second sub groove may be connected to each other, and differently, they may be partitioned by a partition wall formed in the middle.

Meanwhile, although it is illustrated that the third groove 4231 has a T-shape in the drawing and the second magnet parts 620 and 625 are disposed therein, the embodiment is not limited thereto. In detail, the third-second sub groove of the third groove 4231 may be formed to have the same area as the third-first sub groove so as to enlarge the length of the neutral zone around the second-second magnet 615. For example, the sum of the size of the second-second magnet 625 and the size of the neutral zone of the second-second magnet 615 may be the same as the size of the second-first magnet 620, and otherwise it may be larger than this.

The second-first magnet 620 may be a magnet scaler having a structure in which a plurality of magnets having different polarities are sequentially disposed in a third direction corresponding to the optical axis direction. The second-second magnet 625 may be a reference magnet. The second-second magnet 625 may be a single-pole magnet. In detail, the second-second magnet 625 is a single-pole magnetized magnet, and accordingly, it may be referred to as a 'single-pole magnet'. In addition, the second-second magnet 625 is provided to move the lens barrel to the initial position as a reference, and accordingly, it may be referred to as a 'reference magnet'. Hereinafter, the second-second magnet 625 will be described as a single-pole magnet.

The second-first magnet 620 may be disposed adjacent to the second-second magnet 625. For example, the second-first magnet 620 may be disposed in direct contact with the second-second magnet 625 in the third groove 4231. As another example, the second-first magnet 620 may be disposed to be spaced apart from the second-second magnet 625 in the third groove 4231 by a predetermined interval.

The second-first magnet 620 and the second-second magnet 625 may be separated from each other. That is, the second-first magnet 620 and the second-second magnet 625 may be a magnet scaler and a single-pole magnet manufactured by being individually magnetized to each other.

Also, the second-first magnet 620 and the second-second magnet 625 may be integrally formed with each other. That is, the second-first magnet 620 and the second-second magnet 625 may be an integrated magnet formed by being magnetized at once.

In addition, a fourth groove 4232 may be disposed on the second upper surface 423. The fourth groove 4232 may be spaced apart from the third groove 4231. The fourth groove 4232 may be disposed in an edge region of the second upper surface 423. The fourth groove 4232 may provide a region in which a portion of the second elastic part 430, which will be described later, is disposed. In detail, the fourth groove 4232 may provide a region in which the second elastic part 430 is mounted and fixed.

The second lower surface 421 may face the inner lower surface 121 of the housing 100. The second lower surface 421 may face the inner lower surface 121 of the housing 100 in the second direction (y-axis direction). The second lower surface 421 may include a plurality of sub lower surfaces. In detail, the second lower surface 421 may include a first sub-lower surface 421a and a second sub-lower surface 421b disposed above the first sub-lower surface 421a in the second direction (y-axis direction). That is, the second sub lower surface 421b may be disposed adjacent to the second upper surface 423 than the first sub lower surface 421a. At least one second fastening protrusion (not shown) may be disposed on the second sub lower surface 421b. The second fastening protrusion may have a shape protruding downward from the second sub-lower surface 421b. The second fastening protrusion may be inserted into a second fixing groove (not shown) formed in a second elastic part 430 to be described later.

Also, the second lower surface 421 may include a second stepped surface 425 disposed between the first sub lower surface 421a and the second sub lower surface 421b. The second stepped surface 425 may be connected to ends of the first sub-lower surface 421a and the second sub-lower surface 421b. The second stepped surface 425 may be defined as the second stepped portion 425. That is, the second lower surface 421 may include the first sub lower surface 421a, the second sub lower surface 421b, and the second stepped portion 425 and may have a stepped structure.

The second side surface 422 may be disposed between the second upper surface 423 and the second lower surface 421. In detail, the second side surface 422 may be a surface connecting the second upper surface 423 and the second lower surface 421. In more detail, the second side surface 422 may be a surface connecting the second sub lower surface 421b and the second upper surface 423. The second side surface 422 may face the first inner surface 123 of the second housing 120 to be described later.

A second recess 4421 may be disposed on the second side surface 422. The second recess 4421 may have a concave shape from the second side surface 422 toward the second barrel part 410. Also, the second recess 4421 may have a groove shape extending in the optical axis direction (z-axis direction). The second recess 4421 may have a V-shape when viewed from the front.

The second guide part 420 may include a second insertion hole 420h1. The second insertion hole 420h1 may be a hole passing through one surface and the other surface of the second guide part 420. Here, one surface of the second guide part 420 may be a surface facing the first lens barrel 200, and the other surface may be a surface opposite to the one surface and facing the image sensor 900.

A second pin 450 may be disposed in the second insertion hole 420h1. The second pin 450 may be disposed to pass through the second insertion hole 420h1. The second pin 450 may have a shape extending in the optical axis direction (z-axis direction). The second pin 450 may be spaced apart from the first pin 250 and may be parallel to the first pin 250. The second pin 450 may have a length in the optical axis direction longer than that of the second lens barrel 400. The second pin 450 may be coupled to at least one of the first housing 110 and the second housing 120. The second lens barrel 400 may move the second pin 450 as a movement axis in the optical axis direction. Through this, the third lens part 405 disposed in the second lens barrel 400 may perform a zoom function and/or an autofocus function.

The second elastic part 430 may be disposed on the second guide part 420. For example, the second elastic part 430 may be disposed on the second upper surface 423, the second lower surface 421, and the second side surface 422 of the second guide part 420. The second elastic part 430 may be coupled to the second guide part 420.

The second elastic part 430 may include a third elastic member 431 and a fourth elastic member 432.

The third elastic member 431 may be coupled to the second guide part 420. The third elastic member 431 may be disposed at a set position on the second side surface 422.

The third elastic member 431 may have a shape corresponding to the second side surface 422. For example, the third elastic member 431 may include a seventh region 431a, an eighth region 431b, and a ninth region 431c.

The seventh region 431a and the eighth region 431b may be disposed on the second side surface 422 of the second guide part 420 and may be spaced apart from each other. The seventh region 431a and the eighth region 431b may be disposed on a region of the second side surface 422 in which the second recess 4421 is not disposed.

The ninth region 431c may be disposed between the first region 231a and the second region 231b to connect the two regions 431a and 431b. The ninth region 431c may be disposed in a region corresponding to the second recess

4421. The ninth region 431c may have a V-shape corresponding to the second recess 4421.

The fourth elastic member 432 may be disposed on the second guide part 420. The fourth elastic member 432 may be coupled to the second guide part 420.

The fourth elastic member 432 may include a tenth region 432a, an eleventh region 432b, and a twelfth region 432c.

The tenth region 432a may be disposed on the second lower surface 421 of the second guide part 420. In detail, the tenth region 432a may be disposed on the second sub lower surface 421b of the second guide part 420. The tenth region may include a second fixing groove (not shown). The second fixing groove may be disposed in a region corresponding to the second fastening protrusion, and may have a shape corresponding to the second fastening protrusion.

The eleventh region 432b may be connected to the tenth region 432a. For example, the eleventh region 432b may be bent at one end of the tenth region 432a and disposed on the second side surface 422 of the second guide part 420. The eleventh region 432b may be disposed on the third elastic member 431. The eleventh region 432b may be parallel to the seventh region 431a and the eighth region 431b. The eleventh region 432b may be disposed to cover the third elastic member 431.

The twelfth region 432c may be connected to the eleventh region 432b. For example, the twelfth region 432c may be bent at one end of the eleventh region and disposed on the second upper surface 423 of the second guide part 420. A portion of the twelfth region 432c may be inserted into the second groove 2232 disposed on the second upper surface 423.

That is, the fourth elastic member 432 may be physically coupled to the second guide part 420 as the twelfth region 432c is inserted into the fourth groove 4232 while the second fixing groove formed in the seventh region 431a is coupled to the second fastening protrusion.

In addition, the second lens barrel 400 may further include a second guide groove 4221. The second guide groove 4221 may be disposed in a region extending outwardly from the second barrel part 410. The second guide groove 4221 may be disposed in a region corresponding to the first pin 250. The second guide groove 4221 may provide a space into which the first pin 250 is inserted. The second lens barrel 400 may move in the optical axis direction by the first pin 250 and the second pin 450. In this case, the second guide groove 4221 may have an open shape at one side. For example, the second guide groove 4221 may have an open side facing the second inner surface of the housing 100. Accordingly, friction and vibration generated when the second lens barrel 400 is moved by the second driving part 500 can be minimized.

The camera actuator 1000 may include a second driving part 500. The second driving part 500 may be disposed in the housing 100. The second driving part 500 may be coupled to the second lens barrel 400. The second driving part 500 may move the second lens barrel 400 in the optical axis direction (z-axis direction).

The second driving part 500 may include a second piezoelectric device 510, a second extension bar 520, a third buffer member 521, and a fourth buffer member 522.

The second piezoelectric device 510 may include a piezoelectric device. For example, the second piezoelectric device 510 may include a material that causes mechanical deformation by an applied voltage. The second piezoelectric device 510 may contract or expand by an applied voltage and may cause mechanical deformation in a set direction. For example, the second piezoelectric device 510 may generate vibration while causing mechanical deformation in the optical axis direction (z-axis direction) by an applied voltage.

The second piezoelectric device 510 may include a second disk portion 511 and a second protrusion portion 512. The second disk portion 511 has a plate shape and may be disposed on the third hole 113. For example, the second disk portion 511 may be disposed on the third protrusion 113a of the third hole 113. In detail, the second disk portion 511 may be disposed on the plurality of third sub-protrusions. The third protrusion 113a may support the second disc portion 511.

The second protrusion 512 may be disposed under the second disk portion 511. In detail, the second protrusion 512 may be disposed under the second disk portion 511 in the third direction (z-axis direction) and may be connected to the second disk portion 511. A portion of the first protrusion 512 may be disposed in the third hole 113. The second protrusion 512 may have a shape protruding toward the image sensor 900. The width (x-axis, y-axis direction) of the second protrusion 512 may change toward the optical axis direction. For example, the width of the second protrusion 512 may decrease as it approaches the image sensor 900.

The second extension bar 520 may extend in the optical axis direction. The second extension bar 520 may be disposed parallel to the optical axis and may be connected to the second piezoelectric device 510. For example, an upper end of the second extension bar 520 may be connected to the second protrusion 512. In addition, the lower end of the second extension bar 520 may be inserted into the lower end of the housing 100, for example, a fifth hole (not shown) formed at the lower end of the second housing 120.

In addition, one region of the second extension bar 520 may be connected to the second lens barrel 400. For example, the second extension bar 520 may be connected to the second lens barrel 400 by the second elastic part 430. In detail, the second extension bar 520 may be disposed between the third elastic member 431 and the fourth elastic member 432. In more detail, the second extension bar 520 may be disposed between the ninth region 431c of the third elastic member 431 and the eleventh region 432b of the fourth elastic member 432. The second extension bar 520 may be fixed by the elastic force of the third elastic member 431 and the fourth elastic member 432.

The second extension bar 520 may transmit the vibration generated by the second piezoelectric device 510 to the second lens barrel 400. The second lens barrel 400 may move upward or downward (z-axis direction, optical-axis direction) according to the vibration direction of the second extension bar 520. Through this, the third lens part 405 in the second lens barrel 400 may move to perform a zooming function of zooming up or out.

The third buffer member 521 may be disposed on the second extension bar 520. The third buffer member 521 may be disposed on an upper region of the second extension bar 520. The third buffer member 521 may be disposed in the third hole 113 of the housing 100. For example, the third buffer member 521 may be disposed between the third protrusion 113a and the fourth protrusion 1134 of the third hole 113. The third buffer member 521 may be fixed to a position set by the third protrusion 113a and the fourth protrusion 1134. In addition, the third buffer member 521 may include a through hole into which the second extension bar 520 is inserted.

The fourth buffer member 522 may be disposed on the second extension bar 520. The fourth buffer member 522 may be disposed on a lower region of the second extension bar 520. The fourth buffer member 522 may be spaced apart from the third buffer member 521 in the optical axis direction. The fourth buffer member 522 may be disposed in a fifth hole (not shown) of the housing 100. The fourth buffer member 522 may be disposed to be inserted into the fifth hole. The second buffer member 322 may include a through hole into which the second extension bar 520 is inserted.

The third buffer member 521 and the fourth buffer member 522 may prevent noise caused by the vibration of the second extension bar 520. In addition, the third buffer member 521 and the fourth buffer member 522 may prevent the second extension bar 520 from being deformed or damaged by an external impact.

The camera actuator 1000 may include a first sensing part 830, a first magnet part 610 and 615, a second sensing part 840, and a second magnet part 620 and 625.

The first magnet part 610 and 615 may include a first-first magnet 610 and a first-second magnet 615. As described above, the first-first magnet 610 is a magnet scaler. Also, the first-second magnets 615 are reference magnets, which may also be single-pole magnetized single-pole magnets.

Hereinafter, for convenience of description, the first-first magnet 610 will be referred to as a first magnet scaler 610, and the first-second magnet 615 will be described as a first single-pole magnet 615. In addition, the first magnet part 610 and 615 are disposed on the first lens barrel 200 to move together with the first lens barrel 200, and accordingly, it may be referred to as a 'moving part'.

The first magnet scaler 610 may be disposed on the first lens barrel 200. For example, the first magnet scaler 610 may be disposed on the first lower surface 223. In detail, the first magnet scaler 610 may be disposed in the first groove 2231 of the first lens barrel 200. For example, the first groove 2231 may include a first-first sub groove and a first-second sub groove. In addition, the first magnet scaler 610 may be disposed in the first-first sub groove of the first groove 2231.

The first magnet scaler 610 may move along the optical axis direction together with the first lens barrel 200.

The first magnet scaler 610 may include a plurality of magnets. For example, the first magnet scaler 610 may have an N pole and an S pole alternately disposed in the optical axis direction.

The first single-pole magnet 615 may be disposed on the first lens barrel 200. For example, the first single-pole magnet 615 may be disposed on the first lower surface 223 together with the first magnet scaler 610. In detail, the first single-pole magnet 615 may be disposed in the first groove 2231 of the first lens barrel 200 together with the first magnet scaler 610. For example, the first groove 2231 may include a first-first sub groove and a first-second sub groove. In addition, the first single-pole magnet 615 may be disposed in the first-second sub groove of the first groove 2231.

The first single-pole magnet 615 may move along the optical axis direction together with the first lens barrel 200 like the first magnet scaler 610.

The first single-pole magnet 615 may include one single magnet. For example, the first single-pole magnet 615 may be a single-pole magnet in which an N pole and an S pole are disposed in a direction perpendicular to the optical axis direction.

Also, the first single-pole magnet 615 may be a magnet including a neutral zone. Here, the neutral zone of the first single-pole magnet 615 may be formed in a direction parallel to the optical axis direction, but is not limited thereto. Here, the neutral zone means the interface between the N pole and the S pole of the magnet. The neutral zone of the first single-pole magnet 615 may be formed through a magnetization process. The magnetization process refers to the process of making a ferromagnetic material, not a magnet, into a magnet, and it refers to making a permanent magnet by applying a strong external magnetic field to a ferromagnetic material to be manufactured as a magnet. When the magnetization process is performed, the surface in contact with the magnetization applying an external magnetic field becomes the N pole (or S pole), and the other side automatically becomes the S pole (N pole). At this time, the automatically generated boundary between the N pole and the S pole is called a neutral zone.

The first sensing part 830 may be disposed adjacent to the first magnet scaler 610 and the first single-pole magnet 615. For example, the first sensing part 830 may be disposed to face the first magnet scaler 610 in a first direction (x-axis direction) or a second direction (y-axis direction). Specifically, the first sensing part 830 may be disposed to face the first magnet scaler 610 and the first single-pole magnet 615 in the second direction (y-axis direction). As will be described later, the first sensing part 830 is disposed on the substrate 800. In this case, the substrate 800 may be disposed to surround a partial region of the housing 100. In this case, the substrate 800 may be disposed to surround a region overlapping a region where the first magnet scaler 610 and the single-pole magnet 615 are disposed in the second direction.

Specifically, the second housing 120 may include a first hole 126 formed in a region overlapping a region where the first magnet scaler 610 and the first single-pole magnet 615 are disposed in the second direction. That is, the second housing 120 may include a first hole 126 corresponding to the first magnet scaler 610 and the first single-pole magnet 615.

In addition, the substrate 800 may be disposed to cover the first hole 126. In this case, the first sensing part 830 may be disposed in a region of the substrate 800 corresponding to the first hole 126. Specifically, the first sensing part 830 disposed on the substrate 800 may be positioned in the first hole 126. That is, the first sensing part 830 may be disposed to face the first magnet scaler 610 and the first single-pole magnet 615 through the first hole 126.

The first sensing part 830 may sense the position of the first magnet scaler 610 and the position of the first single-pole magnet 615. Accordingly, the first sensing part 830 may sense the position and movement of the first lens barrel 200 moving together with the first magnet scaler 610 and the first single-pole magnet 615.

The first magnet scaler 610 may have a length corresponding to a stroke of the first lens barrel 200. For example, the first magnet scaler 610 may sense the current position of the first lens barrel 200 through the first sensing part 830 within the stroke of the first lens barrel 200.

The second magnet part 620 and 625 may include a second-first magnet 620 and a second-second magnet 625. As described above, the second-first magnet 620 may be a magnet scaler, and the second-second magnet 615 may be a single-pole magnet, but is not limited thereto. In addition, the second magnet part 620 and 625 is disposed on the second lens barrel 400 to move together with the second lens barrel 400, and accordingly, it may be referred to as a 'moving part'.

Hereinafter, for convenience of description, the second-first magnet 620 will be referred to as a second magnet scaler 620, and the second-second magnet 625 will be described as a second single-pole magnet 625.

The second magnet scaler 620 may be disposed on the second lens barrel 400.

For example, the second magnet scaler 620 may be disposed on the second upper surface 423. In detail, the second magnet scaler 660 may be disposed in the third groove 4231 of the second lens barrel 400. For example, the third groove 4231 may include a third-first sub groove and a third-second sub groove. In addition, the second magnet scaler 620 may be disposed in the third-first sub groove of the third groove 4231.

The second magnet scaler 620 may move along the optical axis direction together with the second lens barrel 400.

The second magnet scaler 620 may include a plurality of magnets. For example, the second magnet scaler 620 may have an N pole and an S pole alternately disposed in the optical axis direction.

The second single-pole magnet 625 may be disposed on the second lens barrel 400. For example, the second single-pole magnet 625 may be disposed on the second upper surface 423 together with the second magnet scaler 620. In detail, the second single-pole magnet 625 may be disposed in the third groove 4231 of the second lens barrel 400 together with the second magnet scaler 620. For example, the second single-pole magnet 625 may be disposed in the third-second sub-groove of the third groove 4231.

The second single-pole magnet 625 may move along the optical axis direction together with the second lens barrel 400 like the second magnet scaler 620.

The second single-pole magnet 625 may include one single magnet. For example, the second single-pole magnet 625 may be a single-pole magnet in which an N pole and an S pole are disposed in a second direction (y-axis direction) perpendicular to the optical axis direction.

Also, the second single-pole magnet 625 may be a magnet including a neutral zone. Here, the neutral zone of the second single-pole magnet 625 may be formed in a direction parallel to the optical axis direction, but is not limited thereto. Here, the neutral zone means the interface between the N pole and the S pole of the magnet. The neutral zone of the second single-pole magnet 625 may be formed through a magnetization process. Magnetization process refers to the process of making a ferromagnetic material, not a magnet, into a magnet, and it refers to making a permanent magnet by applying a strong external magnetic field to a ferromagnetic material to be manufactured as a magnet. When the magnetization process is performed, the surface in contact with the magnetization applying an external magnetic field becomes the N pole (or S pole), and the other side automatically becomes the S pole (N pole). At this time, the automatically generated boundary between the N pole and the S pole is called a neutral zone.

The second sensing part 840 may be disposed adjacent to the second magnet scaler 620 and the second single-pole magnet 625. For example, the second sensing part 840 may be disposed to face the second magnet scaler 620 in a first direction (x-axis direction) or a second direction (y-axis direction). Also, the second sensing part 840 may be disposed to face the second single-pole magnet 625 in a first direction (x-axis direction) or a second direction (y-axis direction).

Specifically, the second sensing part 840 may be disposed to face the second magnet scaler 620 and the second single-pole magnet 625 in the second direction (y-axis direction). As will be described later, the second sensing part 840 is disposed on the substrate 800. In this case, the substrate 800 may be disposed to surround a partial region of the housing 100. In this case, the substrate 800 may be disposed to surround a region overlapping a region where the second magnet scaler 620 and the single-pole magnet 625 are disposed in the second direction.

Specifically, the second housing 120 may include a second hole 127 formed in a region overlapping a region in which the second magnet scaler 620 and the second single-pole magnet 625 are disposed in the second direction. That is, the second housing 120 may include a second hole 127 corresponding to the second magnet scaler 620 and the second single-pole magnet 625.

In addition, the substrate 800 may be disposed to cover the second hole 127. In this case, the second sensing part 840 may be disposed in a region of the substrate 800 corresponding to the second hole 127. Specifically, the second sensing part 840 disposed on the substrate 800 may be position in the second hole 127. The second sensing part 840 may be disposed to face the second magnet scaler 620 and the second single-pole magnet 625 through the second hole 127.

The second sensing part 840 may sense the position of the second magnet scaler 620 and the position of the second single-pole magnet 625. Accordingly, the second sensing part 840 may sense the position and movement of the second lens barrel 400 moving together with the second magnet scaler 620 and the second single pole magnet 625.

The second magnet scaler 620 may have a length corresponding to the stroke of the second lens barrel 400. For example, the second magnet scaler 620 may sense the current position of the second lens barrel 400 through the second sensing part 840 in the stroke of the second lens barrel 400.

Meanwhile, as described above, the first magnet scaler 610 and the first single pole magnet 615 are disposed in the first lens barrel 200.

In addition, the second magnet scaler 620 and the second single pole magnet 625 are disposed in the second lens barrel 400.

The first magnet scaler 610 may be provided to sense a position of the first lens barrel 200 in a movement stroke of the first lens barrel 200.

The second magnet scaler 620 may be provided to sense a position of the second lens barrel 400 in a movement stroke of the second lens barrel 400.

The first single-pole magnet 615 may be provided to sense the initial position of the first lens barrel 200. That is, the first single-pole magnet 615 may be disposed in a region corresponding to the initial position of the first lens barrel 200.

The second single pole magnet 625 may be provided to sense the initial position of the second lens barrel 400. That is, the second single-pole magnet 625 may be disposed in a region corresponding to the initial position of the second lens barrel 400.

A position sensing operation of the first lens barrel 200 using the first magnet scaler 610 and the first single pole magnet 615 and a position sensing operation of the second lens barrel 400 using the second magnet scaler 620 and the second single pole magnet 625 will be described in more detail below.

In addition, the first magnet scaler 610 and the first single pole magnet 615 are disposed on one surface of the first lens barrel 200. In addition, the second magnet scaler 620 and the second single-pole magnet 625 are disposed on the other surface of the second lens barrel. In detail, the first magnet scaler 610 and the first single-pole magnet 615 may be disposed on an upper surface or a lower surface of the first lens barrel 200. In addition, the second magnet scaler 620 and the second single pole magnet 625 may be disposed on a lower surface or an upper surface of the first lens barrel 200 that is opposite to a surface on which the first magnet scaler 610 and the first single-pole magnet 615 are disposed. For example, as shown in the drawings, the first magnet scaler 610 and the first single-pole magnet 615 may be disposed on a lower surface of the first lens barrel 200. In addition, the second magnet scaler 620 and the second single pole magnet 625 may be disposed on an upper surface of the second lens barrel. Accordingly, in the embodiment, it is possible to minimize the interference between the first magnet scaler 610, the first single-pole magnet 615, the second magnet scaler 620, and the second single-pole magnet 625, and, thus the positions of the first lens barrel 200 and the second lens barrel 400 can be accurately measured.

Also, although not shown in the drawings, the camera actuator 1000 according to the embodiment may further include a gyro sensor (not shown). The gyro sensor may be disposed in the housing 100. The gyro sensor may detect a movement of a user using the camera actuator.

The camera actuator 1000 according to the embodiment may include a substrate 800. The substrate 800 may be disposed on the housing 100. The substrate 800 may be disposed to surround a partial region of the housing 100. For example, the substrate 800 may be disposed to surround a portion of the outer side of the second housing 120. The substrate 800 may provide power or current to components disposed in the housing 100. That is, the substrate 800 may be a circuit board, and may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The substrate 800 may include a first end 810. The first end 810 may be disposed on the first piezoelectric device 310 of the first driving part 300. For example, the first end 810 may be disposed on the first disk portion 311 of the first piezoelectric device 310. In detail, the first end 810 may be disposed on one surface of the first disk portion 311. Also, the first end 810 may be disposed on the second piezoelectric device 510 of the second driving part 500. For example, the second end 820 may be disposed on the second disk portion 511 of the second piezoelectric device 510. In detail, the first end 810 may be disposed on one surface of the second disc portion 511.

The substrate 800 may include a second end 820. The first end 810 may be spaced apart from the first end 810. Also, the second end 820 may be disposed in a region that does not overlap the first end 810 in the optical axis direction.

The second end 820 may be disposed on the first piezoelectric device 310 of the first driving part 300. For example, the second end 820 may be disposed on the first disk portion 311 of the first piezoelectric device 310. In detail, the first end 810 may be disposed on the other surface opposite to one surface of the first disk portion 311. Also, the second end 820 may be disposed on the second piezoelectric device 510 of the second driving part 500. For example, the second end 820 may be disposed on the second disk portion 511 of the second piezoelectric device 510. In detail, the second end 820 may be disposed on the other surface opposite to one surface of the second disk portion 511.

That is, the substrate 800 may supply power to the first piezoelectric device 310 and the second piezoelectric device 510. Accordingly, the first driving part 300 and the second driving part 500 may drive the first lens barrel 200 and the second lens barrel 400 by the applied power, respectively.

A driver IC (not shown) may be disposed on the substrate 800. The driver IC may control the operations of the first driving part 300 and the second driving part 500. Specifically, the driver IC may control intensity or polarity of power supplied to the first piezoelectric device 310 and the second piezoelectric device 310.

That is, the driver IC may control the first driving part 300 to move the first lens barrel 200 in a –optic axis direction or a +optic axis direction based on the initial position. In addition, the driver IC may control the second driving part 500 to move the second lens barrel 400 in the – optical axis direction or + optical axis direction based on the initial position.

Meanwhile, the driver IC may control the first driving part 300 and the second driving part 500 according to the sensing signal sensed through the first sensing part 830 and the second sensing part 840.

First, the driver IC allows the first sensing part 830 to acquire a first sensing signal by the magnetic force generated from the first single-pole magnet 615. In addition, the driver IC may control the first driving part 300 to move the first lens barrel 200 to an initial position using the first sensing signal. That is, as the first lens barrel 200 moves, the first single-pole magnet 615 also moves. Accordingly, a difference occurs in the first sensing signal acquired through the first sensing part 830 according to the position of the first lens barrel 200. Accordingly, the driver IC may store a first reference value for the first sensing signal corresponding to the initial position of the first lens barrel 200. In addition, the driver IC may move the position of the first lens barrel 200 so that a first sensing signal corresponding to the first reference value is received through the sensing part 830.

In addition, the driver IC allows the first sensing part 830 to acquire a second sensing signal by the magnetic force generated from the first magnet scaler 610. In addition, the driver IC may control the first driving part 300 to move the first lens barrel 200 to a target position using the second sensing signal. A difference occurs in the second sensing signal acquired through the first sensing part 830 according to the position of the first lens barrel 200. Accordingly, the driver IC may control the first driving part 300 using a second reference value for a second sensing signal corresponding to the target position of the first lens barrel 200.

In addition, the driver IC allows the second sensing part 840 to acquire a third sensing signal by the magnetic force generated from the second single-pole magnet 625. In addition, the driver IC may control the second driving part 500 to move the second lens barrel 400 to an initial position using the third sensing signal. That is, as the second lens barrel 400 moves, the second single-pole magnet 625 also moves. Accordingly, a difference occurs in the third sensing signal acquired through the second sensing part 840 according to the position of the second lens barrel 400. Accordingly, the driver IC may store a third reference value for a third sensing signal corresponding to the initial position of the second lens barrel 400. In addition, the driver IC may move the position of the second lens barrel 400 so that a second sensing signal corresponding to the third reference value is received through the second sensing part 840.

In addition, the driver IC allows the second sensing part 840 to acquire a fourth sensing signal by the magnetic force generated from the second magnet scaler 620. In addition, the driver IC may control the second driving part 500 to move the second lens barrel 400 to a target position using the fourth sensing signal. A difference occurs in the fourth sensing signal acquired through the second sensing part 840 according to the position of the second lens barrel 400. Accordingly, the driver IC may control the first driving part 300 to a position at which a fourth sensing signal corresponding to the fourth reference value is received based on the fourth reference value corresponding to the target position of the second lens barrel 400.

The camera actuator 1000 according to the embodiment may include an image sensor 900. The image sensor 900 may collect light passing in the order of the first lens part 105, the second lens part 205, and the third lens part 405 and convert it into an image. The image sensor 900 may be disposed to coincide with the optical axis of the lenses of the lens parts 105, 205, and 405. The optical axis of the image sensor 900 and the optical axis of the lens may be aligned.

FIG. 9 is an exploded perspective view of the housing according to the embodiment, and FIG. 10 is a front view of the second housing according to the embodiment. The housing 100 according to the embodiment will be described in more detail with reference to FIGS. 9 and 10.

The housing 100 may have upper and lower partial regions open, and may include an accommodating space therein. The housing 100 may include a first housing 110 and a second housing 120. The first housing 110 and the second housing 120 may be coupled to each other to form an accommodating space therein, and may be provided in a separable structure.

The first housing 110 may accommodate the first lens part 105. For example, the first lens part 105 may be disposed in the first hole 111 of the first housing 110. In addition, the first lens barrel 200 and the second lens barrel 400 may be disposed inside the second housing 120.

The second housing 120 may include an inner lower surface 121, an inner upper surface 122, a first inner surface 123, and a second inner surface 124.

The inner lower surface 121 of the second housing 120 may be a surface facing the first lower surface 223 of the first lens barrel 200 and the second lower surface 421 of the second lens barrel 400. The inner lower surface 121 may be a surface facing the second stepped portion 425.

The inner upper surface 122 may face the inner lower surface 121 in the second direction (y-axis direction). The inner upper surface 122 of the second housing 120 may be a surface facing the first upper surface 221 of the first lens barrel 200 and the second upper surface 423 of the second lens barrel 400. The inner upper surface 122 may be a surface facing the first stepped portion 225.

The first inner surface 123 of the second housing 120 may be disposed between the inner lower surface 121 and the inner upper surface 122. The first inner surface 123 may connect one end of the inner lower surface 121 and one end of the inner upper surface 122. The first inner surface 123 of the second housing 120 may face a side portion of the second lens barrel 400. For example, the first inner surface 123 may be a surface facing the second side surface 422 of the second lens barrel 400. In detail, the first inner surface 123 may face the eleventh region 432b of the fourth elastic member 432.

The second inner surface 124 of the second housing 120 may be disposed between the inner lower surface 121 and the inner upper surface 122. The second inner surface 124 may connect the other end of the inner lower surface 121 and the other end of the inner upper surface 122. The second inner surface 124 may face the first inner surface 123 in a first direction (x-axis direction). The second inner surface 124 of the second housing 120 may face a side portion of the first lens barrel 200. For example, the second inner surface 124 may be a surface facing the first side surface 222 of the first lens barrel 200. In detail, the second inner surface 124 may face the fifth region 232b of the second elastic member 232.

The second housing 120 may include a guide jaw 125. The guide jaw 125 may be disposed on the inner lower surface 121. The guide jaw 125 has a shape that protrudes from the inner lower surface 121 toward the inner upper surface 122 and may extend in the optical axis direction.

An optical axis direction length of the guide jaw 125 may be the same as an optical axis direction length of the inner lower surface 121. In this case, the guide jaw 125 may extend in the optical axis direction from the boundary of the inner lower surface 121 connected to the first housing 110 to the end of the inner lower surface 121.

Also, the optical axis direction length of the guide jaw 125 may be shorter than the optical axis direction length of the inner lower surface 121. In this case, the guide jaw 125 may extend from the boundary of the inner lower surface 121 in the optical axis direction, and may be spaced apart from the end of the inner lower surface 121.

The guide jaw 125 may be disposed adjacent to the second driving part 500 than the first driving part 300. In addition, the guide jaw 125 may be disposed closer to the second pin 450 than the first pin 250.

Also, the second housing 120 may include a first hole 126 and a second hole 127.

The first hole 126 may be an arrangement in which the first sensing part 830 disposed on the substrate 800 is disposed.

Specifically, the first hole 126 may correspond to the first magnet scaler 610 and the first single-pole magnet 615 of the first lens barrel 200 disposed in the second housing 120. Accordingly, the first hole 126 may be formed to correspond to a region in which the first magnet scaler 610 and the first single-pole magnet 615 are disposed. For example, the first hole 126 may be formed in the inner lower surface 121 of the second housing 120. Specifically, the first hole 126 may be formed in a region overlapping the first magnet scaler 610 and the first single-pole magnet 615 in the y-axis of the inner lower surface 121. In addition, the substrate 800 is disposed to cover the first hole 126. In this case, the first sensing part 830 may be disposed on the substrate 800, and at least a portion of the first sensing part 830 may be positioned in the first hole 126. Accordingly, the first sensing part 830, the first magnet scaler 610, and the first single-pole magnet 615 may be disposed to face each other through the first hole 126.

The second hole 127 may be an arrangement in which the second sensing part 840 disposed on the substrate 800 is disposed.

Specifically, the second hole 127 may correspond to the second magnet scaler 620 and the second single pole magnet 625 of the second lens barrel 400 disposed in the second housing 120. Accordingly, the second hole 127 may be formed to correspond to a region in which the second magnet scaler 620 and the second single-pole magnet 625 are disposed. For example, the second hole 127 may be formed in the inner upper surface 122 of the second housing 120. Specifically, the second hole 127 may be formed in a region overlapping the second magnet scaler 620 and the second single-pole magnet 625 in the y-axis of the inner upper surface 122. In addition, the substrate 800 is disposed to cover the second hole 127. In this case, the second sensing part 840 may be disposed on the substrate 800, and at least a portion of the second sensing part 840 may be positioned in the second hole 127. Accordingly, the second sensing part 840, the second magnet scaler 620, and the second single-pole magnet 625 may be disposed to face each other through the second hole 127.

FIG. 11 is a front view of a second driving part disposed in a second housing according to an exemplary embodiment, FIG. 12 is a front view in which first and second driving parts are disposed in a second housing according to an embodiment, and FIG. 13 is a view showing first and second driving parts according to an embodiment.

Specifically, FIGS. 11 and 12 are views illustrating a state in which the first driving part, the second driving part, the first lens barrel, and the second lens barrel are disposed in the second housing and the substrate 800 is disposed on the outer circumferential surface of the second housing.

Referring to FIGS. 11 to 13, the first lens barrel 200 and the second lens barrel 400 may be disposed in the housing 100.

For example, when manufacturing the camera actuator 1000 according to the embodiment, the second lens barrel 400 may be inserted into the second housing 120 before the first lens barrel 200 as shown in FIG. 11. In this case, the second lens barrel 400 may be disposed at a position set by the first pin 250 and the second pin 450.

In detail, the second lens barrel 400 may be disposed so that the second lower surface 421 faces the inner lower surface 121, and the second upper surface 423 may be disposed to face the inner upper surface 122. In addition, the second lens barrel 400 may be disposed so that the second side surface 422 faces the first inner surface 123, and the second guide groove 4221 may be disposed to face the second inner surface 124. That is, the second stepped portion 425 of the second lens barrel 400 may face the inner lower surface 121.

The guide jaw 125 may guide the second lens barrel 400. To this end, the guide jaw 125 may be positioned in a region corresponding to the second lens barrel 400. For example, the guide jaw 125 may be disposed in a region corresponding to the second lower surface 421 and the second stepped portion 425 of the second lens barrel 400. In detail, the guide jaw 125 may be disposed in a region overlapping the second sub lower surface 421b of the second lens barrel 400 in the second direction (y-axis direction), and may be disposed in a region that does not overlap the first sub lower surface 421a.

In this case, the upper surface of the guide jaw 125 may be positioned above the first sub lower surface 421a in the second direction (y-axis direction). Also, the upper surface of the guide jaw 125 may be disposed to face the second sub lower surface 421b. In this case, the upper surface of the guide jaw 125 may be disposed in contact with the second sub lower surface 421b, or may be spaced apart from each other by a predetermined interval.

In addition, one side of the guide jaw 125 may be disposed to face the second stepped portion 425 in the first direction (x-axis direction). At this time, one side of the guide jaw 125 may be disposed in contact with the second stepped portion 425 or may be spaced apart from each other by a predetermined interval.

In detail, the second lens barrel 400 may include a first distance d1. Here, the first distance d1 may be defined as a distance from one side of the second lens barrel 400 to the second stepped portion 425. In detail, the first distance d1 may be defined as a distance in the first direction (x-axis direction) from the second side surface 422 to the second stepped portion 425. The first distance d1 may be greater than or equal to a distance in the first direction from the second side surface 422 to the guide jaw 125. For example, when the first distance d1 is the same as the distance from the second side surface 422 to the guide jaw 125, the guide jaw 125 may come into contact with the first stepped portion 225.

In addition, when the first distance d1 is longer than the distance from the second side surface 422 to the guide jaw 125, the guide jaw 125 may be spaced apart from the first stepped portion 225 by a predetermined distance. In this case, the driving friction of the second lens barrel 400 may be reduced.

Alternatively, when the first distance d1 is shorter than the distance from the second side surface 422 to the guide jaw 125, the second lens barrel 400 may not be inserted into the second housing 120. In detail, in the above-described case, the guide jaw 125 may be positioned in a region corresponding to the first sub lower surface 421a. Accordingly, the second lens barrel 400 may not be inserted into the second housing 120 by the guide jaw 125.

That is, the second lens barrel 400 preferably satisfies the first distance d1 in the above-described range. Accordingly, the second lens barrel 400 can be effectively inserted in the manufacturing process, and the driving friction between the guide jaw 125 and the second lens barrel 400 may be minimized when the second lens barrel 400 is driven.

In addition, the first lens barrel 200 may be inserted and disposed after the second lens barrel 400 is first disposed in the housing 100 as shown in FIG. 12. In this case, the first lens barrel 200 may be disposed at a position set by the first pin 250 and the second pin 450.

In detail, the first lens barrel 200 may be disposed so that the first lower surface 223 faces the inner lower surface 121, and the first upper surface 221 may be disposed to face the inner upper surface 122. In addition, in the first lens barrel 200, the first side surface 222 may be disposed to face the second inner surface 124, and the first guide groove 210h1 may be disposed to face the first inner surface 123. That is, the first stepped portion 225 may face the inner upper surface 122.

The guide jaw 125 may be spaced apart from the first lens barrel 200. For example, the first lens barrel 200 may be disposed in a region that does not correspond to the guide jaw 125. In detail, the first lens barrel 200 may not overlap the guide jaw 125 in the second direction (y-axis direction). Accordingly, the first lens barrel 200 may be inserted without being caught in the guide jaw 125 during the process of disposing it in the housing 100.

The first lens barrel 200 may include a second distance d2. Here, the second distance d2 may be defined as a distance from one side of the first lens barrel 200 to the first stepped portion 225. In detail, the first distance d1 may be defined as a distance in the first direction (x-axis direction) from the first side surface 222 to the first stepped portion 225.

In this case, the first distance d1 and the second distance d2 may be different from each other. In detail, the first distance d1 may be longer than the second distance d2. Also, the second distance d2 may be shorter than a distance in the first direction from the second side surface 422 to the guide jaw 125. Accordingly, it is possible to prevent the first lens barrel 200 from being first inserted and disposed at the position of the second lens barrel 400.

In detail, the first lens barrel 200 and the second lens barrel 400 may have the same or similar appearance to each other. For this reason, in the process of manufacturing the camera actuator, the first lens barrel 200 is mistaken for the second lens barrel 400, and is first inserted into the second lens barrel 400 position and assembled. Accordingly, there is a problem in that an optical characteristic of the camera actuator 1000 is changed and a defect occurs.

However, the first lens barrel 200 and the second lens barrel 400 according to the embodiment may include a first stepped portion 225 and a second stepped portion 425. In addition, the first lens barrel 200 and the second lens barrel 400 may be included a first distance d1 and a second distance d2 different from each other by the first stepped portion 225 and the second stepped portion 425. The distance d2.

In addition, the housing 100 according to the embodiment may include a guide jaw 125 disposed on the inner lower surface 121. In this case, the guide jaw 125 may be disposed at a position corresponding to the second stepped portion 425. In addition, the guide jaw 125 may have a distance characteristic corresponding to the first distance d1.

Accordingly, the second lens barrel 400 can be effectively inserted into the housing 100 in the process of assembling the first lens barrel 200 and the second lens barrel 400. In addition, it is possible to prevent the first lens barrel 200 from being mistakenly mistaken for the second lens barrel 400 to be preferentially disposed at the second lens barrel 400 position during the assembling process.

In detail, the second distance d2 may be shorter than the first distance d1. Accordingly, when the first lens barrel 200 is first inserted into the position of the second lens barrel 400, the first sub upper surface 221a of the first lens barrel 200 may be in contact with the guide jaw 125. That is, the first lens barrel 200 may be caught on the guide jaw 125 so that insertion into the second housing 120 may not be possible.

That is, in the embodiment, the second lens barrel 400 can be easily disposed in the process of manufacturing the camera actuator 1000, and it is possible to prevent the first lens barrel 200 from being inserted in reverse and misplaced. Accordingly, the embodiment may reduce defects due to misplacement and may have improved process efficiency.

Meanwhile, each of the first sensing part 830 and the second sensing part 840 in an embodiment may be configured as a single unit. That is, the first sensing part according to an embodiment 830 may acquire a sensing signal by magnetic force generated from the first magnet scaler 610 and the first single-pole magnet 615 using one sensor. In addition, the second sensing part 840 according to an embodiment may acquire a sensing signal by magnetic force generated from the second magnet scaler 620 and the second single-pole magnet 625 using one sensor.

Accordingly, one first hole 126 may be formed in the inner lower surface 121 of the second housing 120. In addition, one first sensing part 830 disposed on the substrate 800 may be inserted into the first hole 126. That is, in an embodiment, a sensing signal corresponding to the positions of the first magnet scaler 610 and the first single-pole magnet 615 may be acquired by using the first sensing part 830 including one sensor. Accordingly, the first sensing part 830 may be disposed to overlap at least a portion of the first magnet scaler 610 in the y-axis direction. Also, the first sensing part 830 may be disposed to overlap at least a portion of the first single-pole magnet 615 in the y-axis direction. Specifically, the first sensing part 830 may include a first portion overlapping the first magnet scaler 610 in the y-axis direction, and a second portion overlapping the first monopole magnet 615. And, the first sensing part 830 in an embodiment may acquire a first sensing signal corresponding to the magnetic force generated by the combination of the first magnet scaler 610 and the first single-pole magnet 615.

In addition, one second hole 127 may be formed in the inner upper surface 122 of the second housing 120. In addition, one second sensing part 840 disposed on the substrate 800 may be inserted into the second hole 127. That is, in an embodiment, a sensing signal corresponding to the positions of the second magnet scaler 620 and the second single-pole magnet 625 may be acquired using the second sensing part 840 configured with one sensor. Accordingly, the second sensing part 840 may be disposed to overlap at least a portion of the second magnet scaler 620 in the y-axis direction. Also, the second sensing part 830 may be disposed to overlap with at least a portion of the second single-pole magnet 625 in the y-axis direction. Specifically, the second sensing part 840 may include a first portion overlapping the second magnet scaler 620 in the y-axis direction, and a second portion overlapping the second single-pole magnet 625. And, the second sensing part 840 in an embodiment may acquire a second sensing signal corresponding to the magnetic force generated by the combination of the second magnet scaler 620 and the second single-pole magnet 625.

FIG. 14 is a front view of first and second driving parts disposed in a second housing according to another exemplary embodiment. Specifically, FIG. 14 is a view showing a state in which the first and second driving parts are disposed in the second housing, and the substrate is disposed on the outer circumferential surface of the second housing.

Before describing FIG. 14, the characteristics of the first driving part, the second driving part, the first lens barrel, and the second lens barrel are the same as those described in the previous embodiment, and accordingly, a detailed description thereof will be omitted.

Referring to FIG. 14, each of the first sensing part 830 and the second sensing part 840 in another embodiment may be configured in plurality. That is, the first sensing part 830 may acquire first and second sensing signals by magnetic force generated from the first magnet scaler 610 and the first single-pole magnet 615 using two sensors, respectively. Also, the second sensing part 840 may acquire third and fourth sensing signals by magnetic force generated from the second magnet scaler 620 and the second single pole magnet 625 using two sensors, respectively.

Specifically, the first sensing part 830 may include a first-first sub sensing part 831 and a first-second sub sensing part 832. The first-first sub-sensing part 831 may acquire a first sensing signal by a magnetic force generated through the first single-pole magnet 615. To this end, the first-first sub sensing part 831 may be disposed to overlap the first single-pole magnet 615 in the y-axis direction. Also, the first-second sub-sensing part 832 may acquire a second sensing signal by the magnetic force generated through the first magnet scaler 610. To this end, the first-second sub sensing part 832 may be disposed to overlap the first magnet scaler 610 in the y-axis direction.

In addition, the second sensing part 840 may include a second-first sub sensing part 841 and a second-second sub sensing part 842. The second-first sub-sensing part 841 may acquire a third sensing signal by a magnetic force generated through the second single-pole magnet 625. To this end, the second-first sub-sensing part 841 may be disposed to overlap the second single-pole magnet 625 in the y-axis direction. Also, the second-second sub-sensing part 842 may acquire a fourth sensing signal by the magnetic force generated through the second magnet scaler 620. To this end, the second-second sub sensing part 842 may be disposed to overlap the second magnet scaler 620 in the y-axis direction.

Accordingly, two first holes 126 may be formed in the inner lower surface 121 of the second housing 120. In detail, a first-first sub-hole 126a and a first-second sub-hole 126b may be formed in the inner lower surface 121 of the second housing 120. The first-first sub-hole 126*a* may overlap the first single-pole magnet 615 and the first-first sub sensing part 831 in the y-axis direction. Accordingly, at least a portion of the first-first sub sensing part 831 may be positioned in the first-first sub-hole 126*a*. The first-second sub-hole 126*b* may overlap the first magnet scaler 610 and the first-second sub sensing part 832 in the y-axis direction. Accordingly, at least a portion of the first-second sub sensing part 832 may be positioned in the first-second sub-hole 126*b*.

In addition, two second holes 127 may be formed in the inner upper surface 122 of the second housing 120. In detail, a second-first sub-hole 127*a* and a second-second sub hole 127*b* may be formed on the inner upper surface 122 of the second housing 120. The second-first sub hole 127*a* may overlap the second single-pole magnet 625 and the second-first sub-sensing part 841 in the y-axis direction. Accordingly, at least a portion of the second-first sub-sensing part 841 may be positioned in the second-first sub-hole 127*a*. The second-second sub-hole 127*b* may overlap the second magnet scaler 620 and the second-second sub sensing part 842 in the y-axis direction. Accordingly, at least a portion of the second-second sub-sensing part 842 may be positioned in the second-second sub hole 127*b*.

Hereinafter, the characteristics of a first magnet scaler 610, a second magnet scaler 620, a first single-pole magnet 615 and a second single-pole magnet 625, a first sensing part 830, and a second sensing part 840 will be described with reference to the drawings. Before explaining this, the operations of the first sensing part 830 and the second sensing part 840 are substantially the same, and accordingly, hereinafter, the operation of the first sensing part 830 will be mainly described.

FIG. 15 is a view illustrating a sensing signal acquired through a sensing part according to an exemplary embodiment, and FIG. 16 is a view illustrating the second sensing signal shown in FIG. 15 in more detail.

Referring to FIG. 15, the first sensing part 830 may acquire a first sensing signal by a magnetic force generated by the first single-pole magnet 615. Also, the first sensing part 830 may acquire a second sensing signal by the magnetic force generated by the first magnet scaler 610. Specifically, the first sensing part 830 may include a first-first sub sensing part 831 and a first-second sub sensing part 832 as described above.

In addition, the first-first sub sensing part 831 may acquire a first sensing signal by a magnetic force generated from the first single-pole magnet 615. Also, the first-second sub sensing part 832 may acquire a second sensing signal by a magnetic force generated from the first magnet scaler 610. To this end, the embodiment may further include a separate shielding member (not shown) for preventing the magnetic force generated by the first single-pole magnet 615 from being transmitted to the first-second sub sensing part 832 while preventing the magnetic force generated by the first magnet scaler 610 from being transmitted to the first-first sub sensing part 831. For example, the embodiment may enable accurate sensing signals to be acquired from the first-first sub sensing part 831 and the first-second sub sensing part 832 while suppressing mutual magnetic field interference between the first magnet scaler 610 and the first single-pole magnet 615 using a shielding member. Alternatively, the first-first sub sensing part 831 and the first-second sub-sensing part 832 may acquire a first sensing signal and a second sensing signal in different frequency bands, respectively.

In this case, the first sensing signal may be a pulse waveform whose magnitude is changed according to a change in the magnetic force generated by the first single-pole magnet 615. Here, the voltage range of the pulse waveform may correspond to an operating voltage of the first-first sub sensing part 831. For example, the pulse waveform may have a specific voltage value corresponding to the magnetic force within a range of −5V to +5V, but is not limited thereto.

Here, the first sensing part 830 and the second sensing part 840 in the embodiment may be Hall sensors, but is not limited thereto. For example, the first sensing part 830 and the second sensing part 840 may be implemented as any sensor capable of sensing a change in magnetic force in addition to the Hall sensor. For example, the first sensing part 830 and the second sensing part 840 may be implemented as a Giant Magneto Resistance (GMR) sensor.

The first sensing signal is a pulse waveform corresponding to a change in magnetic force generated from the first single-pole magnet 615. Accordingly, the first sensing signal may appear as a pulse waveform having a constant voltage value only in a specific region in which the first single-pole magnet 615 is disposed in the entire movement stroke of the first lens barrel 200. For example, the first sensing signal may have a pulse maintaining 0V, and may appear as a pulse waveform in which a voltage value gradually increases as the first lens barrel 200 approaches an initial position. Also, the first sensing signal may have a pulse waveform having a maximum voltage value V1 when the first lens barrel 200 is moved to the initial position. Also, when the first lens barrel 200 moves from the initial position to another position, the pulse waveform of the first sensing signal may gradually decrease from the maximum voltage value V1.

Accordingly, when the first lens barrel 200 is positioned at the initial position, the pulse waveform of the first sensing signal may have the maximum voltage value V1 corresponding to a first preset reference value.

When the camera module is initially driven, the driver IC may control the first driving part 300 to move the first lens barrel 200 in the + or − optical axis direction. In addition, the driver IC may monitor the first sensing signal that changes according to the movement of the first lens barrel 200. In addition, when the first sensing signal has the first reference value, the driver IC may determine the position of the first lens barrel 200 at the point in time when the first sensing signal corresponding to the first reference value is acquired as the initial position.

Also, the driver IC may move the first lens barrel 200 from the initial position to a target position. In this case, the target position may be determined by at least one of gyro data acquired through the gyro sensor, zoom magnification, and auto-focusing information.

In this case, sensing signal information corresponding to each step position of the first lens barrel 200 in the entire movement stroke of the first lens barrel 200 may be stored in the driver IC. The sensing signal information may be a voltage value or a sensing value of a second sensing signal corresponding to each step position of the first lens barrel 200. That is, the first lens barrel 200 may move by a predetermined step in the + optical axis or the − optical axis direction based on the initial position. For convenience of explanation, FIG. 15 shows that the first lens barrel 200 is movable by 8 steps in the + optical axis direction and 8 steps in the − optical axis direction based on the initial position IP. However, the embodiment is not limited thereto. For example, as shown in FIG. 16, the first lens barrel 200 may be movable by X steps in the + optical axis direction based on the initial position IP and may be movable by Y steps in the − optical axis direction. Here, the X step and the Y step may be the same as or different from each other. For example, the X step may be 1000 steps, and the Y step may be 500 steps, but is not limited thereto.

For example, the first lens barrel 200 may be movable by 8 steps in the + optical axis direction, and may be movable by 8 steps in the − optical axis direction, based on the initial position IP.

Accordingly, the first lens barrel 200 may be movable to positions corresponding to a +first step (S1'), a +second step (S2'), a +third step (S3'), a +fourth step (S4'), a +fifth step (S5'), a +sixth step (S6'), a +seventh step (S7'), a +eighth step (S8') in the +optical axis direction with respect to the initial position IP. In addition, the first lens barrel 200 may be movable to positions corresponding to a −first step (S1), a −second step (S2), a −third step (S3), a −fourth step (S4), a −fifth step (S5), a −sixth step (S6), a −seventh step (S7), a −eighth step (S8) in the − optical axis direction with respect to the initial position IP.

In addition, the driver IC stores sensing signal information corresponding to each of the 16 steps. Then, when the target position is determined, the driver IC checks sensing signal information corresponding to the target position. In addition, the first lens barrel 200 may be moved until a point in time when a second sensing signal corresponding to the checked sensing signal is received.

At this time, as shown in the drawing, the sensing signal information of the +first step (S1') and the +fifth step (S5') may be the same as 'V3'. In addition, the sensing signal information of the +second step (S2'), the +fourth step (S4'), the +sixth step (S6') and the +eighth step (S8') may be the same as '0V'. Also, the sensing signal information of the +third step (S3') and the +seventh step (S7') may be the same as 'V2'.

However, the first lens barrel 200 moves stepwise from the initial position IP. For example, when the first lens barrel 200 is positioned at the initial position IP and moved in the + optical axis direction, the next position of the first lens barrel 200 corresponds to the + first step (S1). The driver IC may recognize the position at the point in time when the sensing signal of the first 'V3' is sensed as the position corresponding to the +first step (S1'), and the position at the point in time when the sensing signal of the second 'V3' is sensed may be recognized as a position corresponding to the +fifth step (S5') of the target position. However, even if the first lens barrel 200 moves stepwise, a slight positional deviation may occur due to various factors. Accordingly, the driver IC may control the first driver to minutely move the first lens barrel 200 until the voltage value corresponding to the second sensing signal becomes the second 'V3' value.

Meanwhile, as shown in FIG. 16, the moving step of the lens barrel in the embodiment may increase. For example, a plurality of sub steps may be additionally included between the initial position IP and the +first step (S1'). For example, six additional sub steps Sa may exist between the initial position IP and the +first step (S1'). In addition, the driver IC may store sensing signal information corresponding to each of the sub steps Sa. For example, first to sixth sub steps may exist in the + optical axis direction from the initial position IP. In addition, the driver IC may store sensing signal information corresponding to the first sub step as 'V4'. Also, the driver IC may store sensing signal information corresponding to the second sub-step as 'V5'. Also, the driver IC may store sensing signal information corresponding to the third sub step as 'V6'. Also, the driver IC may store sensing signal information corresponding to the fourth sub step as 'V7'. Also, the driver IC may store sensing signal information corresponding to the fifth sub step as 'V8'. Also, the driver IC may store sensing signal information corresponding to the sixth sub step as 'V9'.

Meanwhile, in one embodiment as described above, each sensing part includes two sub sensing parts, and each sensing signal corresponding to the magnet scaler and the single-pole magnet was acquired from each sub sensing part. Alternatively, in another embodiment, each sensing part is configured with only one sensing part, and accordingly, each sensing part may acquire only one sensing signal corresponding to the magnet scaler and the single-pole magnet.

FIG. 17 is a view illustrating a sensing signal acquired through a sensing part according to another exemplary embodiment.

As shown in FIG. 17, the first sensing part 830 and the second sensing part 840 may acquire a sensing signal by a magnetic force generated by a corresponding magnet scaler and a single-pole magnet, respectively.

At this time, each sensing signal corresponding to the magnet scaler and the single-pole magnet in the previous embodiment was respectively acquired from the two sub-sensing parts.

Alternatively, the first sensing part 830 and the second sensing part 840 may acquire one sensing signal by the magnetic force generated by the magnet scaler and the single-pole magnet.

In this case, one sensing signal sensed by the first sensing part 830 has a pulse waveform in which the first sensing signal and the second sensing signal described with reference to FIG. 15 are mixed.

In addition, one sensing signal sensed by the second sensing part 840 also has a pulse waveform in which the third sensing signal and the fourth sensing signal are mixed.

In this case, the sensing signal may be the same as the second sensing signal or the fourth sensing signal described above in the remaining region except for a first region R1 in the entire movement stroke.

For example, the sensing signal acquired by the first sensing part 830 may be the same as the above-described second sensing signal in the remaining region except for the first region R1 in the entire movement stroke of the first lens barrel 200. In addition, the sensing signal acquired by the second sensing part 840 may be the same as the above-described fourth sensing signal in the remaining region except for the first region R1 within the entire movement stroke of the second lens barrel 400. At this time, the sensing signals respectively acquired by the first sensing part 830 and the second sensing part 840 have substantially the same characteristics, and accordingly, hereinafter, the sensing signal acquired by the first sensing part 830 will be mainly described.

The first region R1 of the sensing signal may have a voltage value in which both the magnetic force generated by the first magnet scaler 610 and the first single-pole magnet 615 are reflected. In this case, the pulse waveform in the first region R1 may be different from the pattern of the pulse waveform in other regions except for this. That is, the pulse waveform in the region other than the first region R1 has a regular sinusoidal waveform. However, the first region R1 may have a shape such as a broken waveform instead of a regular sine wave. Accordingly, the embodiment may check whether the first lens barrel 200 exists in a position corresponding to the first region R1 by analyzing the pulse waveform of the sensing signal. Also, sensing signal information corresponding to the pulse waveform in the first region R1 may be separately stored. As an example, the driver IC may store sensing signal information corresponding to the initial position IP of the first lens barrel 200 in the first region R1 and positions other than this for each step. Accordingly, it is possible to accurately measure the initial position of the first lens barrel 200 using only the one sensing part, and also to accurately move the first lens barrel 200 to a target position.

Meanwhile, the sensing signal in another embodiment may be a mixed waveform in which two pulse waveforms (eg, a pulse waveform of a first sensing signal and a pulse waveform of a second sensing signal) are mixed. Accordingly, the driver IC may use a band-pass filter (not shown) to separate the mixed waveform into two separate waveforms (eg, a pulse waveform of the first sensing signal and a pulse waveform of the second sensing signal). In addition, the driver IC may accurately move the first lens barrel 200 to an initial position and a target position by using each of the separated individual waveforms.

FIG. 18 is a flowchart for explaining an initial operation method of a camera module according to an embodiment, and FIG. 19 is a flowchart for explaining a method of operating a function of a camera module according to an embodiment.

Hereinafter, a method of operating a camera module according to an embodiment will be described.

Referring to FIG. 18, the driver IC moves the lens barrel S100. In detail, the driver IC controls the first driving part 300 to move the first lens barrel 200 in the + optical axis direction or the − optical axis direction. In addition, the driver IC controls the second driver 500 to move the second lens barrel 400 in the + optical axis direction or the − optical axis direction.

Then, the driver IC confirms the sensing signal acquired from the first sensing part 830 and the second sensing part 840 according to the movement of the first lens barrel 200 or the second lens barrel 400 S110. In detail, the driver IC checks the first sensing signal acquired through the first sensing part 830 and acquires a first sensing value (eg, a voltage value of the first sensing signal) according to the check. In addition, the driver IC checks the third sensing signal acquired through the second sensing part 840 to acquire a corresponding sensing value (eg, a voltage value of the third sensing signal).

Next, the driver IC determines whether the acquired sensing value corresponds to a preset reference value S120. The reference value may include a voltage value (eg, a first reference value) of the first sensing signal in a state in which the first lens barrel 200 is positioned at the initial position IP. Also, the reference value may include a voltage value (eg, a second reference value) of the second sensing signal in a state in which the second lens barrel 400 is positioned at the initial position IP.

In addition, when the voltage value of the first sensing signal is the same as the first reference value, the driver IC may determine that the first lens barrel 200 is positioned at the initial position IP and end the initial operation. In addition, when the voltage value of the third sensing signal is the same as the preset second reference value, the driver IC may determine that the second lens barrel 400 is located at the initial position IP and end the initial operation.

In addition, when the voltage value of the first sensing signal acquired through the first sensing part 830 is different from the first reference value, the driver IC returns to step S100 to move the first lens barrel 200 to the next step. In addition, when the voltage value of the third sensing signal acquired through the second sensing part 840 is different from the second reference value, the driver IC returns to step S100 to move the second lens barrel 400 to the next step.

Referring to FIG. 19, the driver IC may move the first lens barrel 200 and/or the second lens barrel 400 to a target position in a state in which the first lens barrel 200 and the second lens barrel 400 are positioned at the initial position IP.

To this end, the driver IC may determine a target position of the first lens barrel 200 and determine first sensing signal information corresponding to the determined target position. Also, the driver IC may determine a target position of the second lens barrel 400 and determine second sensing signal information corresponding to the determined target position S200. The first sensing signal information may mean a voltage value of a second sensing signal acquired through the first sensing part 830 in a state in which the first lens barrel 200 is positioned at a target position. Also, the second sensing signal information may refer to a voltage value of a fourth sensing signal acquired through the second sensing part 840 in a state in which the second lens barrel 400 is positioned at a target position.

Thereafter, the driver IC controls the first driving part 300 to move the first lens barrel 200 stepwise in the + optical axis direction or the − optical axis direction. In addition, the driver IC controls the second driver 500 to move the second lens barrel 400 stepwise in the + optical axis direction or the − optical axis direction S210.

In addition, the driver IC acquires a second sensing value for the second sensing signal acquired through the first sensing part 830 according to the movement of the first lens barrel 200. That is, as the first lens barrel 200 moves, the driver IC acquires a voltage value of the second sensing signal acquired at the moved position. In addition, the driver IC acquires a sensing value for the fourth sensing signal acquired through the second sensing part 840 according to the movement of the second lens barrel 400. That is, as the second lens barrel 400 moves, the driver IC acquires a voltage value of the fourth sensing signal acquired at the moved position.

Thereafter, the driver IC determines whether the voltage value of the second sensing signal corresponds to the target position of the first lens barrel 200. Also, the driver IC determines whether the voltage value of the fourth sensing signal corresponds to the target position of the second lens barrel 400 S220.

Then, when the voltage value of the second sensing signal corresponds to the target position of the first lens barrel 200, the driver IC ends the moving operation of the first lens barrel 200. Also, when the voltage value of the fourth sensing signal corresponds to the target position of the second lens barrel 400, the driver IC ends the movement of the second lens barrel 400.

In addition, if the voltage value of the second sensing signal does not correspond to the target position of the first lens barrel 200, the driver IC returns to the step S210 to move the first lens barrel 200 to a position corresponding to the next step. Also, if the voltage value of the fourth sensing signal does not correspond to the target position of the second lens barrel 400, the driver IC returns to the step S210 to move the second lens barrel 400 to a position corresponding to the next step.

FIG. 20 is a perspective view of a camera module according to an embodiment, and FIG. 21 is a perspective view in which some components are omitted from the camera module according to the embodiment.

Referring to FIGS. 20 and 21, the camera module 10 according to the embodiment may include one or a plurality of camera actuators. For example, the camera module 10 may include a first camera actuator 1000 and a second camera actuator 2000, and a cover case 15 for protecting the first camera actuator 1000 and the second camera actuator 2000 may be included.

The first camera actuator 1000 may support a plurality of lenses and may perform a zoom function or an autofocus function by moving the lenses in the optical axis direction in response to a control signal from the controller. That is, the first camera actuator 1000 may be the camera actuator of FIGS. 1 to 19 described above.

The second camera actuator 2000 may be an optical image stabilizer (OIS) actuator. In this case, the light incident on the camera module 10 from the outside may be preferentially incident on the second camera actuator 2000. In addition, the light incident on the second camera actuator 2000 may be incident on the first camera actuator 1000 by changing the path of the light, and the light passing through the first camera actuator 1000 may be incident on the image sensor 900.

FIG. 22 is an exploded perspective view of a second camera actuator according to an embodiment. Also, FIG. 23 is a view of a third driving part of the second camera actuator according to the embodiment, and FIG. 24 is a view of a third housing of the second camera actuator according to the embodiment. FIGS. 25 and 26 are views of the prism unit of the second camera actuator according to the embodiment.

The second camera actuator according to the embodiment will be described in more detail with reference to FIGS. 22 to 26.

Referring to FIG. 22, the second camera actuator 2000 may include a cover member 2100, a third housing 2200, a third driving part 2300, and a prism unit 2400.

The cover member 2100 may include an accommodating space therein, and at least one side surface may be open. For example, the cover member 2100 may have a structure in which a plurality of side surfaces connected to each other are opened. In detail, the cover member 2100 may have a structure in which a front surface through which light is incident from the outside, a lower surface corresponding to the first camera actuator 1000, and a rear surface opposite the front surface, and a light movement path of the prism unit 2400, which will be described later, may be provided.

The cover member 2100 may include a rigid material. For example, the cover member 2100 may include a material such as resin, metal, or ceramic, and may support the third housing 2200 disposed in the accommodation space. For example, the cover member 2100 is disposed to surround the third housing 2200, the third driving part 2300, the prism unit 2400, and the like, and may support the components.

Referring to FIG. 23, the third driving part 2300 may include a driving part circuit board 2310, a coil unit 2330, and a magnet 2350.

The driving part circuit board 2310 may be connected to a power source (not shown) to apply power to the coil unit 2330. The driving part circuit board 2310 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The coil unit 2330 may be electrically connected to the driving part circuit board 2310. The coil unit 2330 may include one or a plurality of coil units. For example, the coil unit 2330 may include a first coil unit 2331, a second coil unit 2332, and a third coil unit 2333.

The first to third coil units 2331, 2332, and 2333 may be spaced apart from each other. For example, the driving part circuit board 2310 may have a 'C' shape, and the first coil unit 2331 and the second coil unit 2332 may be respectively disposed on first and second surfaces of the driving part circuit board 2310 facing each other. Also, the third coil unit 2333 may be disposed on a third surface connecting the first and second surfaces of the driving part circuit board 2310.

The magnet 2350 may include one or a plurality of magnets. For example, the magnet 2350 may include a first magnet 2351, a second magnet 2352, and a third magnet 2353 disposed in a region corresponding to the coil unit 2330. In detail, the first magnet 2351 may be disposed on a region corresponding to the first coil unit 2331 on the first surface of the driving part circuit board 2310. Also, the second magnet 2352 may be disposed on a region corresponding to the second coil unit 2332 on the second surface of the driving part circuit board 2310. Also, the third magnet 2353 may be disposed on a region corresponding to the third coil unit 2333 on the third surface of the driving part circuit board 2310.

The third driving part 2300 may further include a Hall sensor. For example, the Hall sensor includes a first Hall sensor (not shown) disposed adjacent to one coil unit selected from among the first coil unit 2331 and the second coil unit 2332, and a second Hall sensor (not shown) disposed adjacent to the third coil unit 2333.

The third driving part 2300 may tilt the prism unit 2400. The third driving part 2300 may control the tilting of the prism unit 2400 along a first axis or a second axis.

Referring to FIG. 24, the third housing 2200 may include an accommodation space for accommodating the prism unit 2400. The third housing 2200 may include a plurality of inner surfaces. For example, the third housing 2200 may be included a first surface 2200S1 corresponding to a first region of the driving part circuit board 2310 and a second surface 2200S2 corresponding to a second region of the driving part circuit board 2310, and a third surface 2200S3 corresponding to the third region of the driving part circuit board 2310.

In detail, the third housing 2200 includes a first surface 2200S1 corresponding to the first coil unit 2331, a second surface 2200S2 corresponding to the second coil unit 2332, and the third surface 2200S3 corresponding to the third coil unit 2333. In addition, the third housing 2200 may include a fourth surface 2200S4 connected to the first surface 2200S1 and the second surface 2200S2 and connected to the third surface 2200S3.

The third housing 2200 may include a plurality of housing holes 2210. The housing hole 2210 may be a through hole penetrating the outer and inner surfaces of the third housing 2200. The plurality of housing holes 2210 may include first to third housing holes 2211, 2212, and 2213. The first housing hole 2211 may be a through hole passing through the first surface 2200S1 and an outer surface corresponding to the first surface 2200S1. The second housing hole 2212 may be a through hole passing through the second surface 2200S2 and an outer surface corresponding to the second surface 2200S2. The third housing hole 2213 may be a through hole passing through the third surface 2200S3 and an outer surface corresponding to the third surface 2200S3.

The first housing hole 2211 may be disposed in a region corresponding to the first coil unit 2331. Also, the first housing hole 2211 may have a size and shape corresponding to that of the first coil unit 2331. Accordingly, the first coil unit 2331 may be partially or entirely inserted into the first housing hole 2211.

The second housing hole 2212 may be disposed in a region corresponding to the second coil unit 2332. Also, the second housing hole 2212 may have a size and shape corresponding to that of the second coil unit 2332. Accordingly, the second coil unit 2332 may be partially or entirely inserted into the second housing hole 2212.

The third housing hole 2213 may be disposed in a region corresponding to the third coil unit 2333. Also, the third housing hole 2213 may have a size and shape corresponding to that of the third coil unit 2333. Accordingly, the third coil unit 2333 may be partially or entirely inserted into the third housing hole 2213.

Referring to FIGS. 25 and 26, the prism unit 2400 may be disposed in the third housing 2200. In detail, the prism unit 2400 may be disposed in the accommodation space of the third housing 2200.

The prism unit 2400 may include a prism 2410 and a prism mover 2430 disposed on the prism 2410.

The prism 2410 may be a right-angle prism. The prism 2410 may reflect the direction of light incident from the outside. That is, the prism 2410 may change the path of the light incident to the second camera actuator 2000 from the outside toward the first camera actuator 1000.

The prism mover 2430 may be disposed on the prism 2410. The prism mover 2430 may be disposed to surround the prism 2410. At least one side of the prism mover 2430 may be open and may include an accommodating space therein. In detail, the prism mover 2430 may have a structure in which a plurality of outer surfaces connected to each other are opened. For example, the prism mover 2430 may have a structure in which an outer surface corresponding to the prism 2410 is open, and may include an accommodation space defined as a first space 2435 therein.

The prism mover 2430 may include an inner surface 2435S. The inner surface 2435S may be an inner surface constituting the first space 2435. The first space 2435 may have a shape corresponding to the prism 2410. The inner surface 2435S of the first space 2435 may directly contact the prism 2410.

The prism mover 2430 may include a step 2436. The step 2436 may be disposed in the first space 2435. The step 2436 may serve as a guide and/or a seating part for the prism 2410. In detail, a protrusion corresponding to the step 2436 may be formed on the outside of the prism 2410. The prism 2410 may be disposed in the first space 2435 such that the protrusion is guided by the step 2436 of the prism mover 2430. Accordingly, the prism mover 2430 may effectively support the prism 2410. In addition, the prism 2410 may be seated at a set position, and may have improved alignment characteristics within the prism mover 2430.

The prism unit 2400 may include a plurality of outer surfaces. For example, the prism mover 2430 may include a plurality of outer surfaces. The prism mover 2430 may include a first outer surface 2430S1 corresponding to the first surface 2200S1 of the third housing 2200, a second outer surface 2430S2 corresponding to the second surface 2200S2, a third outer surface 2430S3 corresponding to the third surface 2200S3 and a fourth outer surface 2430S4 corresponding to the fourth surface 2200S4.

Also, the prism mover 2430 may include a plurality of recesses. The recess may be a groove having a concave shape on the outer surface of the prism mover 2430 in the direction of the first space 2435. The plurality of recesses may include a third recess 2433R1, a fourth recess 2433R2, and a fifth recess 2433R3. For example, the third recess 2433R1 may be disposed on the first outer surface 2430S1. The third recess 2433R1 may be disposed in a region corresponding to the first housing hole 2211. Also, the fourth recess 2433R2 may be disposed on the second outer surface

2430S2. The fourth recess 2433R2 may be disposed in a region corresponding to the second housing hole 2212. Also, the fifth recess 2433R3 may be disposed on the third outer surface 2430S3. The fifth recess 2433R3 may be disposed in a region corresponding to the third housing hole 2213. That is, the first housing hole 2211 may correspond to the first coil unit 2331, and the second housing hole 2212 may correspond to the second coil unit 2332. Also, the third housing hole 2213 may correspond to the third coil unit 2333.

The magnet 2350 may be disposed in the recess. For example, the first magnet 2351 is in the third recess 2433R1, the second magnet 2352 is in the fourth recess 2433R2, and the third magnet 2353 is in the third recess 2433R1 so that they can be spaced apart from each other.

The prism unit 2400 may control tilting in a first axis (x-axis) or a second axis (y-axis) by a driving part of the third driving part 2300. Here, the first axis tilting may mean tilting in the vertical direction (y-axis direction; second direction) with the x-axis direction shown in the drawing as the rotation axis, and the second axis tilting may mean tilting in the left and right direction (x-axis direction; first direction) with the y-axis direction shown in the drawing as the rotation axis.

The prism unit 2400 may be tilt-controlled based on attractive and repulsive forces generated from the third coil unit 2333 and the third magnet 2353 when power is applied.

In detail, the third driving part 2300 includes a virtual first formed by the first coil unit 2331, the second coil unit 2332, the first magnet 2351, and the second magnet 2352. The prism unit 2400 may be provided rotatably about a line (not shown) as an axis. Here, the first line may be a line extending in the first direction (x-axis direction).

The third coil unit 2333 and the third magnet 2353 may rotate the prism unit 2400 in an up-down direction (y-axis direction) with the first line as a rotation axis.

For example, a repulsive force is generated between the third coil unit 2333 and the third-first magnet of the third magnet 2353, and an attractive force may be generated between the third coil unit 2333 and the third magnet third-second of the third magnet 2353. Here, the third-first magnet and the third-second magnet may face each other in a third direction (z-axis direction). In this case, the prism unit 2400 may be tilted in the upper direction (based on the y-axis direction) by the generated electromagnetic force.

In addition, an attractive force is generated between the third coil unit 2333 and the third-first magnet of the third magnet 2353, and a repulsive force may be generated between the third coil unit 2333 and the third-second magnet of the third magnet 2353. In this case, the prism unit 2400 may be tilted in the lower direction (based on the y-axis direction) by the generated electromagnetic force.

The prism unit 2400 may be tilt-controlled based on attractive and repulsive forces generated from the first coil unit 2331, the second coil unit 2332, the first magnet 2351, and the second magnet 2352 when power is applied.

In detail, the third driving part 2300 may be provided such that the prism unit 2400 can be rotated about a second virtual line (not shown) formed by the third magnet 2353 and the third coil unit 2333 as an axis. Here, the second line may be a line extending in the second direction (y-axis direction).

The first coil unit 2331, the second coil unit 2332, the first magnet 2351 and the second magnet 2352 may rotate and move the prism unit 2400 in a left-right direction (x-axis direction) with the second line as a rotation axis.

For example, a repulsive force is generated between the first coil unit 2331 and the first-first magnet of the first magnet 351, and an attractive force may be generated between the first coil unit 2331 and the first-second magnet of the first magnet 2351. In addition, an attractive force is generated between the second coil unit 2332 and the second-first magnet of the second magnet 2352, and a repulsive force may be generated between the second coil unit 2332 and the second-second magnet of the second magnet 2352. Here, the first-first magnet and the second-first magnet may face each other in a first direction, and the first-second magnet and the second-second magnet may face each other in a first direction. In this case, the prism unit 2400 may be tilted in the left direction (based on the x-axis direction) by the generated electromagnetic force.

In addition, an attractive force is generated between the first coil unit 2331 and the first-first magnet of the first magnet 2351, and a repulsive force may be generated between the first coil unit 2331 and the first-second magnet of the first magnet 2351. In addition, a repulsive force is generated between the second coil unit 2332 and the second-first magnet of the second magnet 2352, and an attractive force may be generated between the second coil unit 2332 and the second-second magnet of the second magnet 2352. In this case, the prism unit 2400 may be tilted in the right direction (based on the x-axis direction) by the generated electromagnetic force.

That is, the second camera actuator 2000 according to the embodiment may control the movement path of the light incident by the third driving part 2300 including the VCM (Voice Coil Motor) method. However, the embodiment is not limited thereto, and the third driving part 2300 may include a piezoelectric device, for example, a piezo-electric device or a shape memory alloy, and the movement path of the incident light may be controlled by using the piezo element and/or the shape memory alloy.

FIG. 27 is a perspective view of a mobile terminal to which a camera module according to an embodiment is applied.

Referring to FIG. 27, the mobile terminal 3 may include a camera module 10, an autofocus device 31, and a flash module 33 provided on the rear side.

The camera module 10 may include an image capturing function and an auto focus function. For example, the camera module 10 may include an autofocus function using an image.

The camera module 10 processes an image frame of a still image or a moving image acquired by an image sensor in a shooting mode or a video call mode. The processed image frame may be displayed on a predetermined display unit and stored in a memory. A camera (not shown) may also be disposed on the front of the mobile terminal body.

For example, the camera module 10 may include a first camera module 10A and a second camera module 10B. In this case, at least one of the first camera module 10A and the second camera module 10B may include the aforementioned camera module, for example, the camera module 10 according to FIGS. 1 to 20. Accordingly, the camera module 10 may implement an OIS function together with a zoom function and an autofocus function.

The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emitting laser (VC-SEL) semiconductor device and a light receiving unit that converts light energy such as a photodiode into electrical energy.

The flash module 33 may include a light emitting device emitting light therein. The flash module 33 may be operated by a camera operation of a mobile terminal or by a user's control.

Next, FIG. 28 is a perspective view of the vehicle 5 to which the camera module according to the embodiment is applied. For example, FIG. 28 is an external view of a vehicle including a vehicle driving assistance device to which the camera module 10 according to the embodiment is applied.

Referring to FIG. 28, the vehicle 5 according to the embodiment may include wheels 53FL and 53RL that rotate by a power source and a predetermined sensor. The sensor may be the camera sensor 51, but is not limited thereto.

The camera 51 may be a camera sensor to which the camera module 10 according to the embodiment is applied.

The vehicle 5 of the embodiment may acquire image information through a camera sensor 51 that captures a front image or a surrounding image, and it is possible to determine a lane non-identification situation using the image information, and generate a virtual lane when the lane is not identified.

For example, the camera sensor 51 may acquire a front image by photographing the front of the vehicle 5, and a processor (not shown) may acquire image information by analyzing an object included in the front image.

For example, when an object such as a median, curb, or street tree corresponding to a lane, an adjacent vehicle, a driving obstacle, and an indirect road marking is captured in the image captured by the camera sensor 51, the processor may detect such an object and include it in the image information.

In this case, the processor may further supplement the image information by acquiring distance information from the object detected through the camera sensor 51. The image information may be information about an object photographed in an image.

The camera sensor 51 may include an image sensor and an image processing module. The camera sensor 51 may process a still image or a moving image acquired by an image sensor (eg, CMOS or CCD). The image processing module may process a still image or a moving image acquired through the image sensor, extract necessary information, and transmit the extracted information to the processor.

In this case, the camera sensor 51 may include a stereo camera to improve the measurement accuracy of the object and further secure information such as the distance between the vehicle 5 and the object, but is not limited thereto.

The camera actuator and the camera module according to the embodiment may have improved optical properties. In detail, the camera actuator and the camera module according to the embodiment include a driving part for driving the lens group including a piezoelectric device, the lens group can be more precisely controlled by the driving part, and friction generated when the lens group is moved can be minimized. Accordingly, the embodiment may provide more improved autofocus and zoom functions.

In addition, the camera actuator and the camera module according to the embodiment may have improved operational reliability. In detail, the embodiment includes a first magnet part and a second magnet part mounted on the lens barrel. In this case, the first magnet part may include a reference magnet, and the second magnet part may include a magnet scaler. Also, the embodiment may include a sensing part disposed adjacent to the first magnet part and the second magnet. The sensing part may measure a change in a magnetic field by the first magnet part and the second magnet part. That is, the sensing part may precisely move the lens group to the initial position by using the change in the magnetic field by the first magnet part. Also, the sensing part may precisely move the lens group to the target position by using the change in the magnetic field by the second magnet part. Accordingly, the embodiment may improve the accuracy of the autofocus and zoom functions of the camera module, and thus the operation reliability may be improved.

In addition, the camera actuator and the camera module according to the embodiment can eliminate assembly deviation. In detail, although the embodiment includes the first magnet part and the second magnet part, this may be an integrally formed magnet part. That is, the integrally formed magnet part may be a magnet configured by magnetizing a magnet scaler corresponding to the second magnet part and a reference magnet corresponding to the first magnet part at once. Therefore, according to the embodiment, it is possible to solve the position erroneous detection that occurs due to the assembly deviation between the magnet scaler and the reference magnet, and thus the operation reliability can be further improved.

In addition, the camera actuator and the camera module according to the embodiment enable the position of the lens group to be sensed using a magnet scaler and a reference magnet rather than a conventional PI sensor, so that the position of the lens group can be sensed without image deterioration and thus image quality can be improved.

In addition, the camera actuator and the camera module according to the embodiment may have improved process efficiency. In detail, the camera actuator and the camera module according to the embodiment include a housing accommodating a plurality of lens groups, for example, a plurality of lens barrels, and a guide jaw may be disposed on an inner lower surface of the housing facing the lens barrel. In this case, the guide jaw may have a position and a distance corresponding to a set lens barrel among the plurality of lens barrels, thereby preventing an unset lens barrel from being disposed. Accordingly, it is possible to effectively arrange the set lens barrels at the set positions, and it is possible to prevent other lens barrels from being misplaced. Accordingly, the embodiment may reduce defects caused by misalignment of the plurality of lens barrels, and may have improved process efficiency.

Features, structures, effects, etc. described in the above embodiments are included in at least one embodiment, and it is not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and variations should be interpreted as being included in the scope of the embodiments.

In the above, the embodiment has been mainly described, but this is only an example and does not limit the embodiment, and those of ordinary skill in the art to which the embodiment pertains will appreciate that various modifications and applications not illustrated above are possible without departing from the essential characteristics of the present embodiment. For example, each component specifically shown in the embodiment can be implemented by modification. And the differences related to these modifications and applications should be interpreted as being included in the scope of the embodiments set forth in the appended claims.

The invention claimed is:

1. A lens driving device, comprising:
a housing;
a fixed part disposed in the housing and including a first lens part;
a moving part moving relative to the fixed part and including a lens;
a driving part for driving the moving part in an optical axis direction; and
a sensing part for sensing a position of the moving part;
wherein the moving part includes:
a magnet part including:
a magnet scaler having a structure in which a plurality of magnets having different polarities are sequentially disposed in the optical axis direction; and
a reference magnet including a single-pole magnet in which a N-pole and a S-pole are disposed in a direction perpendicular to the optical axis direction, and
wherein the sensing part acquires each of a first sensing signal corresponding to a magnetic force of the reference magnet that changes according to a movement of the moving part and a second sensing signal corresponding to a magnetic force of the magnet scaler that changes according to the movement of the moving part,
wherein the magnet scaler and the reference magnet move together with the lens,
wherein the driving part moves the moving part to an initial position using the first sensing signal, and moves the moving part to a target position using the second sensing signal,
wherein the first sensing signal has a maximum voltage value when the moving part moves to the initial position,
wherein the housing includes a hole in which at least a portion of the sensing part is disposed,
wherein the magnet part and the sensing part overlaps to each other in the direction perpendicular to the optical axis direction,
wherein the moving part further includes:
a first lens barrel disposed to be spaced apart from the fixed part in the optical axis direction in the housing; and
a second lens barrel disposed to be spaced apart from the moving part in the optical axis direction in the housing,
wherein the driving part includes:
a first driving part coupled to the first lens barrel in the housing and driving the first lens barrel in the optical axis direction; and
a second driving part coupled to the second lens barrel in the housing and driving the second lens barrel in the optical axis direction;
wherein the magnet part further includes:
a first magnet part including a first magnet scaler and a first reference magnet disposed on one surface of the first lens barrel; and
a second magnet part including a second magnet scaler and a second reference magnet disposed on an other surface of the second lens barrel,
wherein the sensing part includes:
a first sensing part disposed adjacent to the first magnet part; and
a second sensing part disposed adjacent to the second magnet part, wherein the first lens barrel includes:

a first barrel part including a second lens part;

a first guide part extending outwardly from the first barrel part; and a first elastic part connected to the first driving part, wherein the second lens barrel includes:

a second barrel part including a third lens part;

a second guide part extending outwardly from the second barrel part; and a second elastic part connected to the second driving part, wherein the first driving part includes:

a first piezoelectric device disposed in the housing; and a first extension bar extending in the optical axis direction from the first piezoelectric device, wherein the second driving part includes:

a second piezoelectric device disposed in the housing; and a second extension bar extending in the optical axis direction from the second piezoelectric device, wherein one region of the first extension bar is connected to the first elastic part, and wherein one region of the second extension bar is connected to the second elastic part.

2. The lens driving device of claim 1, wherein a first pole of the reference magnet is disposed to face at least one of a first pole and a second pole of the magnet scaler.

3. The lens driving device of claim 1, wherein the magnet scaler and the reference magnet are coupled to each other.

4. The lens driving device of claim 1, wherein the driving part moves the moving part to acquire the first sensing signal corresponding to a first reference value at the initial position, and moves the moving part to acquire the second sensing signal corresponding to a second reference value at the target position.

5. The lens driving device of claim 1, wherein the hole includes:

a first sub hole corresponding to the magnet scaler, and a second sub hole corresponding to the reference magnet, and wherein the sensing part includes:

a first sub sensing part disposed to face the magnet scaler with respect to the first sub hole; and a second sub sensing part disposed to face the reference magnet with respect to the second sub hole.

6. The lens driving device of claim 1, further comprising a substrate disposed on an outer peripheral surface of the housing, wherein at least a portion of the sensing part is positioned in the hole in a state in which the sensing part is disposed on the substrate.

7. The lens driving device of claim 1, wherein the housing includes:

a first housing in which the fixed part is disposed; and a second housing in which the first lens barrel and the second lens barrel are disposed, and wherein the hole includes:

a first hole formed on a lower surface of the second housing and vertically overlapping with the first magnet part and the first sensing part; and a second hole disposed on an upper surface of the second housing and vertically overlapping with the second magnet part and the second sensing part.

8. The lens driving device of claim 1, further comprising first and second pins extending in the optical axis direction within the housing and spaced apart from each other, wherein the first pin is disposed to be inserted into a first insertion hole of the first lens barrel, wherein the second pin is disposed to be inserted into a second insertion hole of the second lens barrel, wherein the first lens barrel moves along the first pin, and wherein the second lens barrel moves along the second pin.

9. The lens driving device of claim 8, wherein the first lens barrel further includes a first guide groove in which the second pin is disposed, wherein the second lens barrel further includes a second guide groove in which the first pin is disposed, and wherein each of the first and second guide grooves has an open shape at one side.

10. The lens driving device of claim 1, wherein the first magnet part is a first single magnetized magnet in which the first magnet scaler and the first reference magnet are integrally formed, and wherein the second magnet part is a second single magnetized magnet in which the second magnet scaler and the second reference magnet are integrally formed.

\* \* \* \* \*